US012804454B2

(12) United States Patent
Muller et al.

(10) Patent No.: US 12,804,454 B2
(45) Date of Patent: Nov. 17, 2026

(54) UNKNOWN QFI HANDLING IN RAN

(71) Applicant: Telefonaktiebolaget LM Ericsson (publ), Stockholm (SE)

(72) Inventors: Julien Muller, Rennes (FR); Paul Schliwa-Bertling, Ljungsbro (SE); Yong Yang, Kållered (SE); Alexander Vesely, Feldbach (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/129,658

(22) PCT Filed: Nov. 14, 2023

(86) PCT No.: PCT/SE2023/051155

§ 371 (c)(1), (2) Date: May 13, 2025

(87) PCT Pub. No.: WO2024/107097

PCT Pub. Date: May 23, 2024

(65) Prior Publication Data

US 2026/0197697 A1 Jul. 9, 2026

(30) Foreign Application Priority Data

Nov. 14, 2022 (WO) .................. PCT/IB2022/000809

(51) Int. Cl.

*G06F 15/16* (2006.01)
*H04W 28/02* (2009.01)

(52) U.S. Cl.

CPC ....... *H04W 28/0268* (2013.01); *H04W 28/02* (2013.01)

(58) Field of Classification Search

CPC .......................... H04W 28/02; H04W 28/0268

(Continued)

(56) References Cited

U.S. PATENT DOCUMENTS 8,600,057 B2 * 12/2013 Bernard ............ H04Q 11/0067 380/256
9,948,518 B2 * 4/2018 Kamath ............. H04L 41/0661

(Continued)

OTHER PUBLICATIONS

3GPP TS 23.501 V17.6.0 (Sep. 2022), "3rd Generation Partnership Project; Technical Specification Group Services and System Aspects; System architecture for the SG System (SGS); Stage 2 (Release 17)", https://www.3gpp.org/ftp/Specs/archive/23_series/23.501/23501-h60.zip (Continued)

*Primary Examiner* — Moustafa M Meky

(74) *Attorney, Agent, or Firm* — Nicholson De Vos Webster & Elliott LLP

(57) ABSTRACT

A method performed by a first network node in a communication network. The method comprises: receiving a first message from a second network node, wherein the first message indicates that the second network node has received one or more data packets that have a packet qualifier that is not known to the second network node. The method further comprises one or both of the following: (i) sending a second message to the second network node, wherein the second message indicates that the second network node is to discard said data packets; and (ii) sending a third message to the second network node, wherein the third message indicates that the second network node is to send an error message relating to said data packets to a third network node, wherein the third network node is a network node that transferred said data packets to the second network node.

20 Claims, 11 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 10,305,749 | B2 * | 5/2019 | Kamath | H04L 41/0661 |
| 11,140,572 | B2 * | 10/2021 | Cho | H04W 80/08 |
| 11,297,530 | B2 * | 4/2022 | Dao | H04W 28/0268 |
| 11,825,333 | B2 * | 11/2023 | Pan | H04L 47/24 |
| 11,895,533 | B2 * | 2/2024 | Guo | H04L 47/125 |
| 12,081,336 | B2 * | 9/2024 | K N | H04L 1/1809 |
| 12,089,087 | B2 * | 9/2024 | Wu | H04W 4/24 |
| 12,463,907 | B2 * | 11/2025 | Talur | H04L 45/38 |
| 2005/0114540 | A1 * | 5/2005 | Hariharan | H04L 47/10 709/232 |
| 2008/0181394 | A1 * | 7/2008 | Keefe | H04L 63/0485 380/28 |
| 2008/0232257 | A1 * | 9/2008 | Hariharan | H04L 47/10 370/237 |
| 2013/0202112 | A1 * | 8/2013 | Bernard | H04Q 11/0067 380/287 |
| 2017/0026244 | A1 * | 1/2017 | Kamath | H04L 41/0661 |
| 2018/0205614 | A1 * | 7/2018 | Kamath | H04L 41/0661 |
| 2021/0144579 | A1 | 5/2021 | Ke | |
| 2021/0409336 | A1 * | 12/2021 | Talur | H04L 67/53 |
| 2023/0198676 | A1 * | 6/2023 | K N | H04L 1/1809 370/236 |
| 2026/0052105 | A1 * | 2/2026 | Rossbach | H04L 47/24 |

OTHER PUBLICATIONS

3GPP TS 33.210 V17.1.0 (Sep. 2022), "3rd Generation Partnership Project; Technical Specification Group Services and System Aspects; Network Domain Security (NDS); IP network layer security (Release 17)", https://www.3gpp.org/ftp/Specs/archive/33_series/33.210/33210-h10.zip 3GPP TS 37.483 V17.2.0 (Sep. 2022), "3rd Generation Partnership Project; Technical Specification Group Radio Access Network; E1 Application Protocol (E1AP) (Release 17)", https://www.3gpp.org/ftp/Specs/archive/37_series/37.483/37483-h20.zip 3GPP TS 38.300 V17.2.0 (Sep. 2022), "3rd Generation Partnership Project; Technical Specification Group Radio Access Network; NR; NR and NG-RAN Overall Description; Stage 2 (Release 17)", https://www.3gpp.org/ftp/Specs/archive/38_series/38.300/38300-h20.zip 3GPP TS 38.401 V17.2.0 (Sep. 2022), "3rd Generation Partnership Project; Technical Specification Group Radio Access Network; NG-RAN; Architecture description (Release 17)", https://www.3gpp.org/ftp/Specs/archive/38_series/38.401/38401-h20.zip 3GPP TS 38.413 V17.2.0 (Sep. 2022), "3rd Generation Partnership Project; Technical Specification Group Radio Access Network; NG-RAN; NG Application Protocol (NGAP) (Release 17)", https://www.3gpp.org/ftp/Specs/archive/38_series/38.413/38413-h20.zip R3-193941, CATT "CR to 38.463 on NRIIOT Higher Layer Multi-Connectivity Solution#1", 3GPP TSG-RAN WG3 #105, Ljubljana, Slovenia, Aug. 26-30, 2019, Change Request 38.463 CR rev Current version: 15.4.0.

R3-225530, Nokia, Nokia Shanghai Bell, Ericsson, Orange "Correction of shared CU UP", 3GPP TSG-RAN WGB#117bis, E-meeting, Oct. 10-18, 2022, Change Request 37.483 CR 0041 rev 0 Current version: 17.20.

* cited by examiner

UNKNOWN QFI HANDLING IN RAN

CROSS-REFERENCE TO RELATED APPLICATIONS

This application is a National stage of International Application No. PCT/SE2023/051155, filed Nov. 14, 2023, which claims priority to International Application No. PCT/IB2022/000809, filed Nov. 14, 2022, which are all hereby incorporated by reference.

TECHNICAL FIELD

This disclosure relates to the handling of unknown packet qualifiers, such as Quality of Service (QoS) Flow Identifiers (QFIs), in a radio access network (RAN).

BACKGROUND

FIG. 1 illustrates the overall NG-RAN (Next Generation-Radio Access Network) architecture, which is defined in the 3$^{rd}$ Generation Partnership Project (3GPP) Technical Specification (TS) 38.401 v17.2.0. The NG-RAN consists of a set of gNBs connected to the 5$^{th}$ Generation Core (5GC) through the Next Generation (NG) interface. As specified in 3GPP TS 38.300 v17.2.0, NG-RAN could also consist of a set of ng-eNBs, an ng-eNB may consist of an ng-eNB-CU (CU=Central Unit) and one or more ng-eNB-DU(s) (DU=Distributed Unit). An ng-eNB-CU and an ng-eNB-DU is connected via W1 interface. The general principle described in this section also applies to ng-eNB and W1 interface, if not explicitly specified otherwise.

A gNB can support Frequency Division Duplex (FDD) mode, Time Division Duplex (TDD) mode, or dual mode operation. gNBs can be interconnected through the Xn interface. A gNB may consist of a gNB-CU and one or more gNB-DU(s). A gNB-CU and a gNB-DU is connected via F1 interface. One gNB-DU is connected to only one gNB-CU. In the case of network sharing with multiple cell identity (ID) broadcast, each Cell Identity associated with a subset of Public Land Mobile Networks (PLMNs) corresponds to a gNB-DU and the gNB-CU it is connected to, i.e. the corresponding gNB-DUs share the same physical layer cell resources. For resiliency, a gNB-DU may be connected to multiple gNB-CUs by appropriate implementation.

A base station that comprises a Central Unit (CU) and one or more Distributed Units (DUs) is referred to as a "split base station", a "CU-DU split base station" or a "disaggregated base station".

NG, Xn, and F1 are logical interfaces. For NG-RAN, the NG and Xn-C interfaces for a gNB consisting of a gNB-CU and gNB-DUs, terminate in the gNB-CU. For E-UTRAN (Evolved-UMTS Terrestrial Radio Access Network) New Radio-Dual Connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

The node hosting the user plane (UP) part of New Radio (NR) Packet Data Convergence Protocol (PDCP) (e.g. gNB-CU, gNB-CU-UP, and for EN-DC, Master eNB (MeNB) or Secondary gNB (SgNB) depending on the bearer split) shall perform user inactivity monitoring and further informs its inactivity or (re)activation to the node having control plane (CP) connection towards the core network (e.g. over E1, X2). The node hosting NR Radio Link Control (RLC) (e.g. gNB-DU) may perform user inactivity monitoring and further inform its inactivity or (re)activation to the node hosting the control plane, e.g. gNB-CU or gNB-CU-CP.

Uplink (UL) PDCP configuration (i.e. how the User Equipment (UE) uses the UL at the assisting node) is indicated via X2-C (for EN-DC), Xn-C (for NG-RAN) and F1-C. Radio Link Outage/Resume for Downlink (DL) and/or UL is indicated via X2-U (for EN-DC), Xn-U (for NG-RAN) and F1-U.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1), the related TNL protocol and the functionality are specified. The TNL provides services for user plane transport, signalling transport. In NG-Flex configuration, each NG-RAN node is connected to all Access and Mobility Management Functions (AMFs) of AMF Sets within an AMF Region supporting at least one slice also supported by the NG-RAN node. The AMF Set and the AMF Region are defined in 3GPP TS 23.501 v 17.6.0.

If security protection for control plane and user plane data on TNL of NG-RAN interfaces has to be supported, Network Domain Security (NDS)/Internet Protocol (IP) 3GPP TS 33.501 shall be applied.

FIG. 2 illustrates the overall architecture for separation of gNB-CU-CP and gNB-CU-UP, which is specified in 3GPP TS 37.483 v17.2.0. A gNB may consist of a gNB-CU-CP, multiple gNB-CU-UPs and multiple gNB-DUs. The gNB-CU-CP is connected to the gNB-DU through the F1-C interface. The gNB-CU-UP is connected to the gNB-DU through the F1-U interface. The gNB-CU-UP is connected to the gNB-CU-CP through the E1 interface. One gNB-DU is connected to only one gNB-CU-CP. One gNB-CU-UP is connected to only one gNB-CU-CP. It should be noted that, for resiliency, a gNB-DU and/or a gNB-CU-UP may be connected to multiple gNB-CU-CPs by appropriate implementation. One gNB-DU can be connected to multiple gNB-CU-UPs under the control of the same gNB-CU-CP. One gNB-CU-UP can be connected to multiple DUs under the control of the same gNB-CU-CP. It should also be noted that the connectivity between a gNB-CU-UP and a gNB-DU is established by the gNB-CU-CP using Bearer Context Management functions. It should further be noted that the gNB-CU-CP selects the appropriate gNB-CU-UP(s) for the requested services for the UE. In case of multiple CU-UPs they belong to same security domain as defined in 3GPP TS 33.210 v17.1.0. Further of note is that data forwarding between gNB-CU-UPs during intra-gNB-CU-CP handover within a gNB may be supported by Xn-U.

Quality of Service (QoS) Framework in 5$^{th}$ Generation (5G)

The following text, and FIG. 3, are taken from 3GPP TS 38.300 v17.2.0.

The 5G QoS model is based on QoS Flows (see 3GPP TS 23.501 v17.6.0) and supports both QoS Flows that require guaranteed flow bit rate (GBR QoS Flows) and QoS Flows that do not require guaranteed flow bit rate (non-GBR QoS Flows). At Non-Access Stratum (NAS) level (see 3GPP TS 23.501 v17.6.0), the QoS flow is thus the finest granularity of QoS differentiation in a Protocol Data Unit (PDU) session. A QoS flow is identified within a PDU session by a QoS Flow ID (QFI) carried in an encapsulation header over NG-U.

The QoS architecture in NG-RAN, both for NR connected to 5GC and for (Evolved-UMTS Terrestrial Radio Access (E-UTRA) connected to 5GC, is depicted in FIG. 3, and described in the following:

For each UE, 5GC establishes one or more PDU Sessions;

Except for Narrowband-Internet of Things (NB-IoT) and Integrated Access and Backhaul-Mobile Termination (IAB-MT) in Standalone (SA) mode, for each UE, the NG-RAN establishes at least one Data Radio Bearers (DRB) together with the PDU Session and additional DRB(s) for QoS flow(s) of that PDU session can be subsequently configured (it is up to NG-RAN when to do so);

If NB-IoT UE supports NG-U data transfer, the NG-RAN may establish Data Radio Bearers (DRB) together with the PDU Session and one PDU session maps to only one DRB;

The NG-RAN maps packets belonging to different PDU sessions to different DRBs;

NAS level packet filters in the UE and in the 5GC associate UL and DL packets with QoS Flows;

AS-level mapping rules in the UE and in the NG-RAN associate UL and DL QoS Flows with DRBs.

NG-RAN and 5GC ensure quality of service (e.g. reliability and target delay) by mapping packets to appropriate QoS Flows and DRBs. Hence there is a 2-step mapping of IP-flows to QoS flows (NAS) and from QoS flows to DRBs (Access Stratum (AS)).

At NAS level, a QoS flow is characterised by a QoS profile provided by 5GC to NG-RAN and QoS rule(s) provided by 5GC to the UE. The QoS profile is used by NG-RAN to determine the treatment on the radio interface while the QoS rules dictates the mapping between uplink User Plane traffic and QoS flows to the UE. A QoS flow may either be GBR or Non-GBR depending on its profile. The QoS profile of a QoS flow contains QoS parameters, for instance (see 3GPP TS 23.501):

For each QoS flow:

A 5G QoS Identifier (5QI);

An Allocation and Retention Priority (ARP).

In case of a GBR QoS flow only:

Guaranteed Flow Bit Rate (GFBR) for both uplink and downlink;

Maximum Flow Bit Rate (MFBR) for both uplink and downlink;

Maximum Packet Loss Rate for both uplink and downlink;

Delay Critical Resource Type;

Notification Control.

NOTE: The Maximum Packet Loss Rate (UL, DL) is only provided for a GBR QoS flow belonging to voice media.

In case of Non-GBR QoS only:

Reflective QoS Attribute (RQA): the RQA, when included, indicates that some (not necessarily all) traffic carried on this QoS flow is subject to reflective quality of service (RQoS) at NAS;

Additional QoS Flow Information.

The QoS parameter Notification Control indicates whether notifications are requested from the RAN when the GFBR can no longer (or again) be fulfilled for a QoS Flow. If, for a given GBR QoS Flow, notification control is enabled and the RAN determines that the GFBR cannot be guaranteed, RAN shall send a notification towards SMF and keep the QoS Flow (i.e. while the NG-RAN is not delivering the requested GFBR for this QoS Flow), unless specific conditions at the NG-RAN require the release of the NG-RAN resources for this GBR QoS Flow, e.g. due to Radio link failure or RAN internal congestion. When applicable, NG-RAN sends a new notification, informing SMF that the GFBR can be guaranteed again.

If Alternative QoS parameters Sets are received with the Notification Control parameter, the NG-RAN may also include in the notification a reference corresponding to the QoS Parameter Set which it can currently fulfil as specified in 3GPP TS 23.501. The target NG-RAN node may include in the notification control indication the reference to the QoS Parameter Set which it can currently fulfil over Xn to the source NG-RAN node during handover.

In addition, an Aggregate Maximum Bit Rate is associated to each PDU session (Session-AMBR), to each UE (UE-AMBR) and to each slice per UE (UE-Slice-MBR). The Session-AMBR limits the aggregate bit rate that can be expected to be provided across all Non-GBR QoS Flows for a specific PDU Session and is ensured by the User Plane Function (UPF). The UE-AMBR limits the aggregate bit rate that can be expected to be provided across all Non-GBR QoS Flows of a UE and is ensured by the RAN (see clause 10.5.1). The UE-Slice-MBR limits the aggregate bit rate that can be expected to be provided across all GBR and Non-GBR QoS Flows corresponding to PDU Sessions of the UE for the same slice (S-NSSAI) as specified in 3GPP TS 23.501 and is ensured by the RAN (see clause 10.5.1).

The 5QI is associated to QoS characteristics giving guidelines for setting node specific parameters for each QoS Flow. Standardized or pre-configured 5G QoS characteristics are derived from the 5QI value and are not explicitly signalled. Signalled QoS characteristics are included as part of the QoS profile. The QoS characteristics consist for instance of (see 3GPP TS 23.501):

Priority level;

Packet Delay Budget (including Core Network Packet Delay Budget);

Packet Error Rate;

Averaging window;

Maximum Data Burst Volume.

At Access Stratum (AS) level, the data radio bearer (DRB) defines the packet treatment on the radio interface (Uu). A DRB serves packets with the same packet forwarding treatment. The QoS flow to DRB mapping by NG-RAN is based on QFI and the associated QoS profiles (i.e. QoS parameters and QoS characteristics). Separate DRBs may be established for QoS flows requiring different packet forwarding treatment, or several QoS Flows belonging to the same PDU session can be multiplexed in the same DRB.

In the uplink, the mapping of QoS Flows to DRBs is controlled by mapping rules which are signalled in two different ways:

Reflective mapping: for each DRB, the UE monitors the QFI(s) of the downlink packets and applies the same mapping in the uplink; that is, for a DRB, the UE maps the uplink packets belonging to the QoS flows(s) corresponding to the QFI(s) and PDU Session observed in the downlink packets for that DRB. To enable this reflective mapping, the NG-RAN marks downlink packets over Uu with QFI.

Explicit Configuration: QoS flow to DRB mapping rules can be explicitly signalled by Radio Resource Control (RRC).

The UE always applies the latest update of the mapping rules regardless of whether it is performed via reflecting mapping or explicit configuration.

When a QoS flow to DRB mapping rule is updated, the UE sends an end marker on the old bearer.

In the downlink, the QFI is signalled by NG-RAN over Uu for the purpose of RQoS and if neither NG-RAN, nor the NAS (as indicated by the RQA) intend to use reflective mapping for the QoS flow(s) carried in a DRB, no QFI is signalled for that DRB over Uu. In the uplink, NG-RAN can configure the UE to signal QFI over Uu.

For each PDU session, a default DRB may be configured: if an incoming UL packet matches neither an Radio Resource Control (RRC) configured nor a reflective mapping rule, the UE then maps that packet to the default DRB of the PDU session. For non-GBR QoS flows, the 5GC may send to the NG-RAN the Additional QoS Flow Information parameter associated with certain QoS flows to indicate that traffic is likely to appear more often on them compared to other non-GBR QoS flows established on the same PDU session.

Within each PDU session, it is up to NG-RAN how to map multiple QoS flows to a DRB. The NG-RAN may map a GBR flow and a non-GBR flow, or more than one GBR flow to the same DRB, but mechanisms to optimise these cases are not within the scope of standardisation.

QoS Flow Mapping in Disaggregated gNB

In a disaggregated gNB (i.e. 3-split architecture as described in the first part of the Background section), the QoS Flow to PDU Session mapping is first signalled by the AMF to the gNB-CU-CP. The gNB-CU-CP is in charge of the QoS Flow to DRB (Radio Bearer) mapping. This mapping will be signalled at Bearer Context Setup to the gNB-CU-UP and possibly modified at Bearer Context Modification.

Once QoS Flow mapping is established in the RAN, the gNB-CU-UP will receive User Plane (UP) packets, including a QFI, from the UPF. These packets will then be routed, thanks to the QFI, to the corresponding General packet radio service (GPRS) Tunnelling Protocol for the user plane (GTP-U) tunnel (representing the mapped DRB) established between the gNB-CU-UP and the gNB-DU.

There currently exist certain challenge(s). If a QoS Flow with a QFI that is unknown to the gNB(-CU-CP) (i.e. the QFI was not signalled by the Session Management Function (SMF) via the AMF during PDU Session Resource procedures) is received by the UP entity of a gNB, then there is no possibility for this UP entity or the gNB to signal this error condition to the Core Network (CN), which leads to the packets marked with unknown QFI(s) being discarded. The CN cannot correct the QoS mapping or stop the concerned QoS Flow.

There is also no possibility for the gNB-CU-UP to understand if an unknown QFI is known to the gNB-CU-CP, resulting in wrong behaviour by the gNB-CU-UP (e.g. delivering packets to the UE over a wrong DRB or buffering the packets). The gNB(-CU-UP) will also use extra resource (e.g. processing, transport) by receiving unnecessary UP data.

SUMMARY

Certain aspects of the disclosure and their embodiments may provide solutions to these or other challenges. Two alternative solutions are discussed below, one that primarily provides the solution in the user plane (UP), and one that primarily provides the solution in the control plane (CP), although it will be noted that both solutions involve new operations in both UP and CP network nodes, and there is some overlap in the operations of various network nodes between the two solutions. While specific embodiments are described herein as relating to an unknown QFI, it will be appreciated that the techniques described herein can be applied to any type of packet qualifier that can be associated with one or more data packets.

User Plane (UP) Solution:

Embodiments for a first network node (e.g. a gNB-CU-CP) are provided. Generally, the first network node can be the control plane entity of the central unit in a split/disaggregated base station. In these embodiments, a method of operating the first network node may include any one or more of the following steps:

- Receive a first message from a second network node (e.g. a gNB-CU-UP) indicating that a QoS Flow (or a User Plane packet) with an unknown QFI, which has not been configured at Bearer Context Setup or Bearer Context Modification for a UE, and for which there is no QoS Flow to DRB mapping configured, has been received from a third network node (e.g. a UPF);
- Determine that the unknown QFI received by the second network node has not been configured by a fourth network node (e.g. a SMF which communicates with the base station via the AMF) in any PDU Session Resource procedure triggered for this UE;
- Send a second message to the second network node indicating that the packets of the unknown QFI shall be discarded;
- Send a third message to the second network node indicating that the second network shall send a GPRS Tunnelling Protocol (GTP) error indication message or other GTP-U message to the third network node indicating that the packets are dropped due to unknown QFI(s) where unknown QFI(s) are included.

Embodiments for a second network node (e.g. a gNB-CU-UP) are provided. Generally, the second network node can be a user plane entity of the central unit in a split/disaggregated base station. In these embodiments, a method of operating the second network node may include any one or more of the following steps:

- Receive from a third network node (e.g. a UPF) a QoS Flow (or a User Plane packet) with an unknown QFI, which has not been configured at Bearer Context Setup or Bearer Context Modification for a UE, and for which there is no QoS Flow to DRB mapping configured;
- Send a first message to the first network node (e.g. a gNB-CU-CP) indicating that a QoS Flow (or a User Plane packet) with an unknown QFI, which has not been configured at Bearer Context Setup or Bearer Context Modification for a UE, and for which there is no QoS Flow to DRB mapping configured, has been received from a third network node (e.g. a UPF);
- In response to the first message, receive a second message from the first network node indicating that the packets of the unknown QFI shall be discarded;
- Upon receiving the second message, discard all DL data belonging to the QoS Flow indicated in the second message;
- In response to the first message, receiving a third message from the first network node indicating that the second network node shall send an GTP-U error indication message or other GTP-U message to the third network node indicating that the packets is dropped due to unknown QFI(s), where the unknown QFI(s), and optionally the number of dropped packets (for charging correlation), are also included in the message;
- Upon receiving the third message, sending an GTP-U error indication message or other GTP-U message to the third network node indicating that the received QoS Flow has not yet been configured by the Core Network in any of the already established PDU Session Resource.

Embodiments for a third network node (e.g. a UPF or PDU Session Anchor (PSA) UPF) are provided. Generally, the third network node can be a user plane entity in a core network of the communication network. In these embodiments, a method of operating the third network node may include any one or more of the following steps:

- Send to the second network node a QoS Flow (or a User Plane packet) with an unknown QFI, which has not been configured at Bearer Context Setup or Bearer Context Modification for a UE, and for which there is no QoS Flow to DRB mapping configured;
- Receive an GTP-U error indication message or other GTP-U message from the second network node indicating that the received QoS Flow has not yet been configured by the Core Network in any of the already established PDU Session Resource;
- Stop sending UP packets from this QoS Flow to the second network node;
- In case of it is an Intermediate-UPF or a Visiting-UPF, the UPF shall forward the said indication to the PSA UPF or Home UPF respectively in a GTP-U error indication message or other GTP-U message;
- The third network node notifies using Packet Forwarding Control Protocol (PFCP) Session Report request message to the fourth network node (i.e. SMF) indicating that the received QoS Flow has not yet been configured by the Core Network in any of the already established PDU Session Resource where the unknown QFI(s), and optionally the number of dropped packets (for charging correlation), are also included in the message.

Embodiments for a fourth network node (e.g. a SMF) are provided. Generally, the fourth network node can be a session management entity of a core network. In these embodiments, a method of operating the fourth network node may include any one or more of the following steps:

- Receive PFCP Session Report request message with the indication from the third network node that the received QoS Flow has not yet been configured by the Core Network in any of the already established PDU Session Resource, where the unknown QFI(s), and optionally the number of dropped packets (for charging correlation), are also included in the message;
- In case of it is an Intermediate-SMF or a Visiting-SMF, forward the said indication to the Anchor SMF or Home SMF respectively;
- Based on the reception of the indication that the received QoS Flow has not yet been configured by the Core Network in any of the already established PDU Session Resource, trigger corrective measures, e.g. reconfigures the third or the first network node. The fourth network node may adjust the charging data record for the PDU session.

Control Plane (CP) Solution:

Embodiments for a first network node (e.g. a gNB-CU-CP) are provided. Generally, the first network node can be the control plane entity of the central unit in a split/disaggregated base station. In these embodiments, a method of operating the first network node may include any one or more of the following steps:

- Receive a first message from a second network node (e.g. a gNB-CU-UP) indicating that a QoS Flow (or a User Plane packet) with an unknown QFI, which has not been configured at Bearer Context Setup or Bearer Context Modification for a UE, and for which there is no QoS Flow to DRB mapping configured, has been received from a third network node (e.g. a UPF), where the unknown QFI(s), and optionally the number of dropped packets (for charging correlation), are also included in the message;
- Determine that the unknown QFI received by the second network node has not been configured by a fourth network node (e.g. a SMF via AMF) in any PDU Session Resource procedure triggered for this UE;
- Send a second message to the second network node indicating that the packets of the unknown QFI shall be discarded;
- Send a third message e.g. PDU Session Resource Notify or other NG Application Protocol (NGAP) message whichever applicable to the fourth network node indicating that an unknown QoS Flow (i.e. not mapped to any of the already established PDU Session Resource) has been received, where the unknown QFI(s), and optionally the number of dropped packets (for charging correlation), are also included in the message.

Embodiments for a second network node (e.g. a gNB-CU-UP) are provided. Generally, the second network node can be a user plane entity of the central unit in a split/disaggregated base station. In these embodiments, a method of operating the second network node may include any one or more of the following steps:

- Receive from a third network node (e.g. a UPF) a QoS Flow (or a User Plane packet) with an unknown QFI, which has not been configured at Bearer Context Setup or Bearer Context Modification for a UE, and for which there is no QoS Flow to DRB mapping configured;
- Send a first message to the first network node (e.g. gNB-CU-CP) indicating that a QoS Flow (or a User Plane packet) with an unknown QFI, which has not been configured at Bearer Context Setup or Bearer Context Modification for a UE, and for which there is no QoS Flow to DRB mapping configured, has been received from a third network node (e.g. UPF);
- In response to the first message, receiving a second message from the first network node indicating that the packets of the unknown QFI shall be discarded;
- Upon receiving the second message, discarding all DL data belonging to the QoS Flow indicated in the second message.

Embodiments for a fourth network node (e.g. a SMF via an AMF) are provided. Generally, the fourth network node can be a session management entity of a core network. In these embodiments, a method of operating the fourth network node may include any one or more of the following steps:

- Receive a third message e.g. PDU Session Resource Notify or other NGAP message whichever applicable from the first network node indicating that an unknown QoS Flow (i.e. not mapped to any of the already established PDU Session Resource) has been received, where the unknown QFI(s), and optionally the number of dropped packets (for charging correlation), are also included in the message;
- In case of it is an Intermediate-SMF or a Visiting-SMF, forward the said indication to the Anchor SMF or Home SMF respectively.
- Based on the reception of the indication that an unknown QoS Flow (i.e. not mapped to any of the already established PDU Session Resource) has been received, the fourth network node triggers corrective measures, e.g. reconfigures the third network node (e.g. a UPF) or the first network node. The fourth network node, e.g. the SMF, may adjust charging data record for the PDU session.

Thus, in the context of a 5G QoS framework, this disclosure provides new E1 Application Protocol (E1AP) signalling from gNB-CU-CP to gNB-CU-UP to inform that the packets of the unknown QoS Flow are to be discarded, and that the gNB-CU-UP shall signal the QoS Flow error to the UPF via UP signalling. This disclosure also provides new NG Application Protocol (NGAP) signalling from gNB(-CU-CP) to AMF/SMF to inform that the received QoS Flow has not been configured by the CN.

According to a first specific aspect, there is provided a method performed by a first network node in a communication network. The method comprises: receiving a first message from a second network node, wherein the first message indicates that the second network node has received one or more data packets that have a packet qualifier that is not known to the second network node; wherein the method further comprises one or both of the following steps: (i) sending a second message to the second network node, wherein the second message indicates that the second network node is to discard said data packets; and (ii) sending a third message to the second network node, wherein the third message indicates that the second network node is to send an error message relating to said data packets to a third network node, wherein the third network node is a network node that transferred said data packets to the second network node.

According to a second aspect, there is provided a method performed by a second network node in a communication network. The method comprises: sending a first message to a first network node, wherein the first message indicates that the second network node has received one or more data packets that have a packet qualifier that is not known to the second network node; wherein the method further comprises one or both of the following steps: (i) receiving a second message from the first network node, wherein the second message indicates that the second network node is to discard said data packets; and (ii) receiving a third message from the first network node, wherein the third message indicates that the second network node is to send an error message relating to said data packets to a third network node, wherein the third network node is a network node that transferred said data packets to the second network node.

According to a third aspect, there is provided a method performed by a third network node in a communication network. The method comprises: receiving an error message from a second network node relating to one or more data packets sent to the second network node by the third network node, wherein the error message indicates any of: a packet qualifier; that the packet qualifier is not known to the second network node; that said data packets have been discarded due to the packet qualifier not being known to the second network node; that a Quality of Service, QoS, Flow corresponding to the packet qualifier has not been configured by a core network of the communication network; and a number of data packets discarded by the second network node.

According to a fourth aspect, there is provided a method performed by a fourth network node in a communication network. The method comprises: receiving a notification message from a third network node, wherein the notification message indicates that a Quality of Service, QoS, Flow relating to a packet qualifier has not yet been configured.

According to a fifth aspect, there is provided a method performed by a first network node in a communication network. The method comprises: receiving a first message from a second network node, wherein the first message indicates that the second network node has received one or more data packets that have a packet qualifier that is not known to the second network node; wherein the method further comprises one or both of the following steps: (i) sending a second message to the second network node, wherein the second message indicates that the second network node is to discard said data packets; and (ii) sending a third message to a fourth network node, wherein the third message indicates that the second network node has received data packets with a packet qualifier that is not known to the second network node, wherein the fourth network node is a network node that is responsible for configuring resources for Quality of Service, QoS, Flows.

According to a sixth aspect, there is provided a method performed by a fourth network node in a communication network. The method comprising: receiving a third message from a first network node, wherein the third message indicates that a second network node has received one or more data packets with a packet qualifier that is not known to the second network node.

According to a seventh aspect, there is provided a computer program product comprising a computer readable medium having computer readable code embodied therein, the computer readable code being configured such that, on execution by a suitable computer or processor, the computer or processor is caused to perform the method according to any of the aspects or embodiments described herein.

According to an eighth aspect, there is provided a network node configured to perform the method according to any of the aspects or embodiments described herein.

According to a ninth aspect, there is provided a network node comprising a processor and a memory, said memory containing instructions executable by said processor whereby said network node is operative to perform the method according to any of the aspects or embodiments described herein.

According to a tenth aspect, there is provided a network node, comprising: processing circuitry configured to cause the network node to perform the method according to any of the aspects or embodiments described herein; and power supply circuitry configured to supply power to the processing circuitry.

Certain embodiments may provide one or more of the following technical advantages. The gNB-CU-UP (or more generally a user plane entity of the central unit in a split/disaggregated base station) can understand that the unknown QoS Flow has not been configured by the CN in the gNB and therefore can discard the UP packets. The UPF (or more generally a user plane entity in a core network of the communication network) can understand that there is a misconfiguration between the PDU Session Resources configured in NG-RAN and 5GC. 5GC/SMF (or more generally the core network or a session management entity of the core network) can take corrective actions towards the UPF and, if needed, also towards NG-RAN.

BRIEF DESCRIPTION OF THE DRAWINGS

Some of the embodiments contemplated herein will now be described more fully with reference to the accompanying drawings, in which.

DETAILED DESCRIPTION

Figure 1:
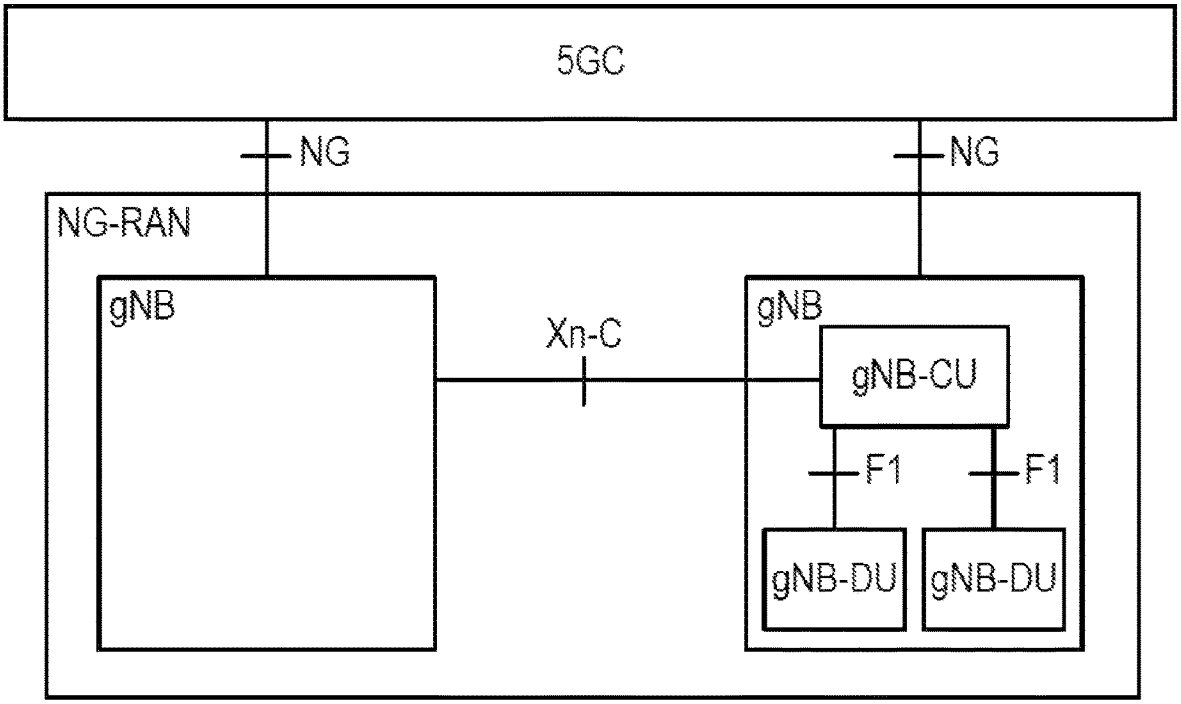
FIG. 1 illustrates the overall NG-RAN architecture.
Figure 2:
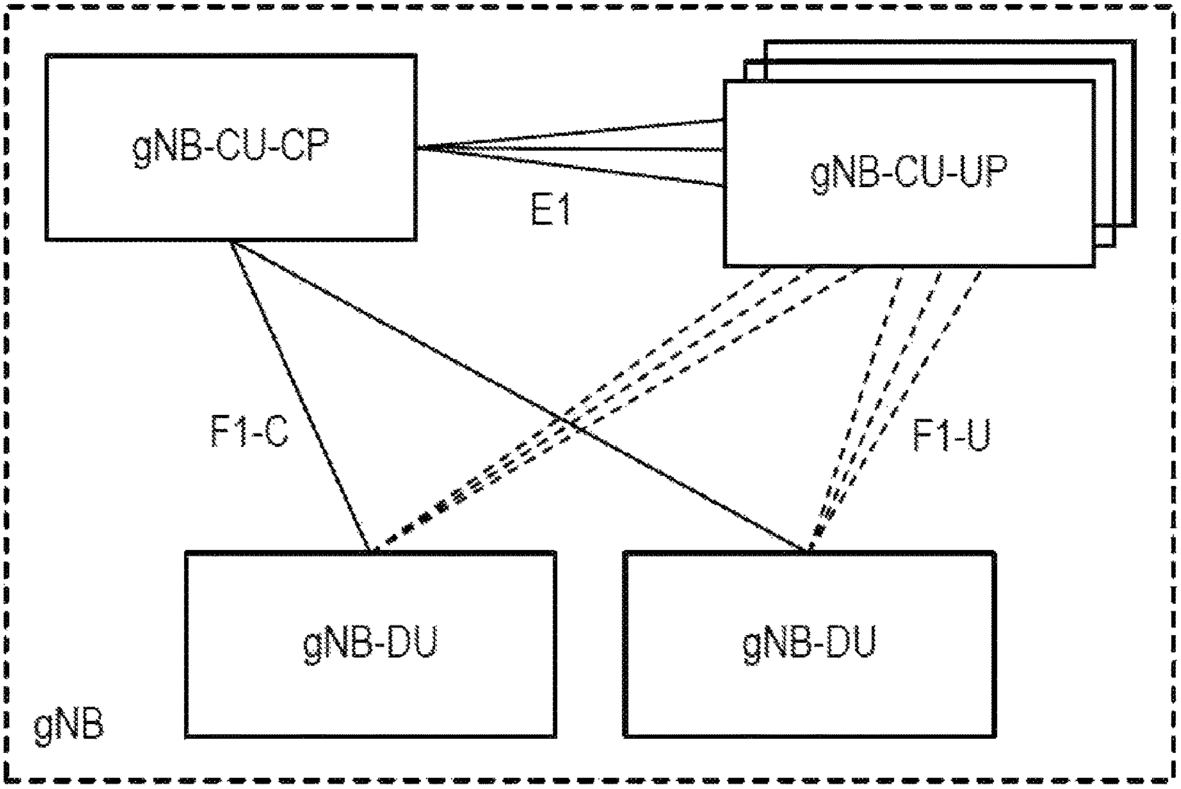
FIG. 2 illustrates the overall architecture for separation of gNB-CU-CP and gNB-CU-UP.
Figure 3:
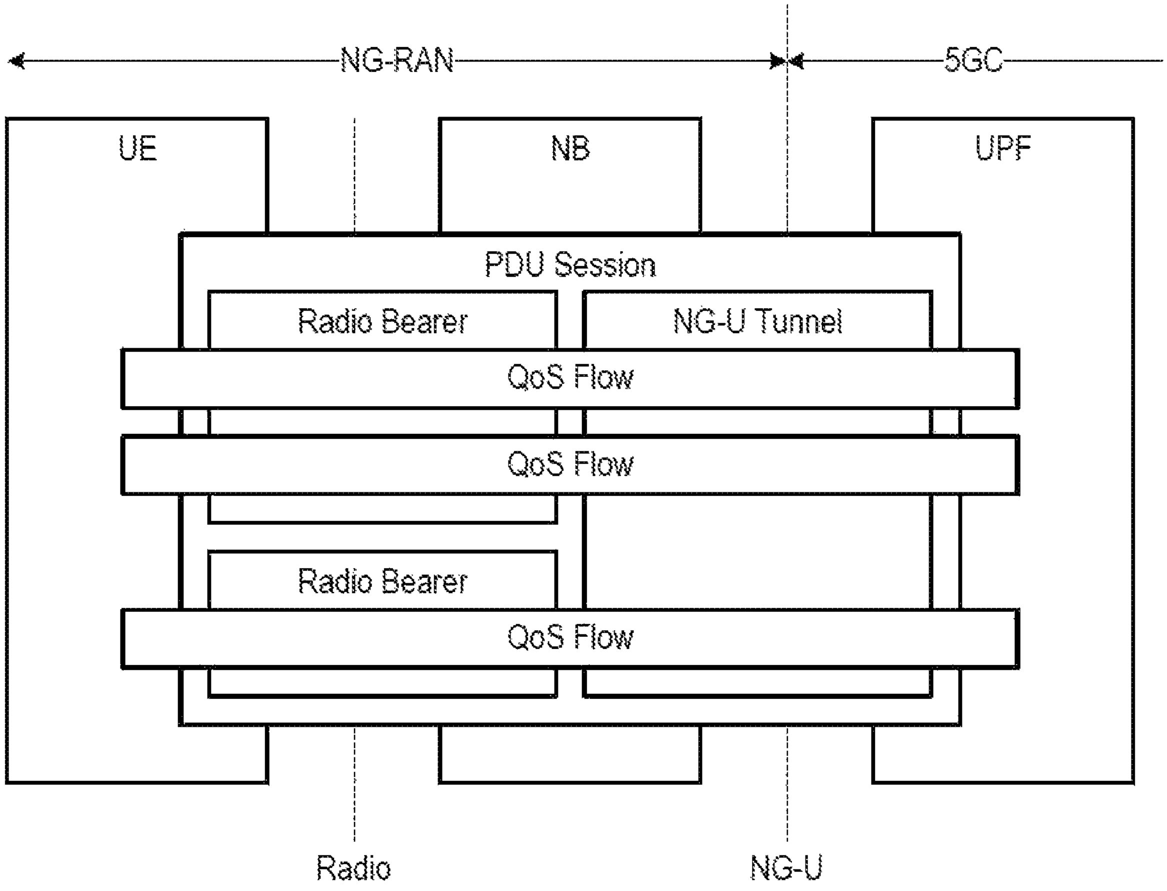
FIG. 3 shows the QoS architecture in NG-RAN.

Some of the embodiments contemplated herein will now be described more fully with reference to the accompanying drawings. Embodiments are provided by way of example to convey the scope of the subject matter to those skilled in the art.

As noted above, two alternative solutions to the problems discussed herein are presented, with both solutions involving operations by different network nodes in the RAN and Core of a communication network. The terms "first network node", "second network node", "third network node" and "fourth network node" are used herein. Generally, "first network node" refers to the control plane entity of the central unit in a split/disaggregated base station, such as a gNB-CU-CP, or similar. Generally, "second network node" refers to a user plane entity of the central unit in a split/disaggregated base station, such as a gNB-CU-UP, or similar. Generally, "third network node" refers to a user plane entity in a core network of the communication network, such as a UPF or PSA UPF, or similar. Generally, "fourth network node" refers to a session management entity of a core network in the communication network, such as a SMF, or similar.

Thus, a network node can be any of a RAN node, an Operations Administration and Maintenance (OAM) node, a Core Network node, a Service Management and Orchestration (SMO) node, a Network Management System (NMS), a Non-Real Time RAN Intelligent Controller (Non-RT RIC), a Real-Time RAN Intelligent Controller (RT-RIC), a gNB, eNB, en-gNB, ng-eNB, gNB-CU, gNB-CU-CP, gNB-CU-UP, eNB-CU, eNB-CU-CP, eNB-CU-UP, Integrated Access and Backhaul (IAB)-node, IAB-donor DU, IAB-donor-CU, IAB-DU, IAB-MT, O-CU, O-CU-CP, O-CU-UP, O-DU, O-RU, O-eNB, a Cloud-based network function, a Cloud-based centralised training node, a UPF, a PSA UPF or a SMF.

The embodiments below discuss the applicability of the Control Plane and User Plane solutions described herein to Multicast Broadcast Service (MBS) sessions and MBS QoS flows, or any other QoS flows that are part of data sessions specified in the future. For MBS sessions, the following apply:

- the fourth network node may be a Multicast Broadcast (MB)-SMF and the third network node may a MB-UPF;
- signalling between gNB-CU-CP and gNB-CU-UP concerns Multicast Bearer Contexts or Broadcast Bearer Contexts;
- signalling between gNB and MB-SMF concerns Multicast (MBS) Sessions or Broadcast (MBS) Sessions;
- signalling between gNB-CU-UP and MB-UPF concern MBS Session tunnels.

User Plane (UP)-Based Solution:

Methods of operating a first network node, second network node, third network node and fourth network node according to the UP-based solution are set out below.

In the first network node, e.g. a gNB-CU-CP, the method can include one or more of the following steps:

- Receive a first message from a second network node (e.g. a gNB-CU-UP) indicating that a QoS Flow (or a User Plane packet) with an unknown QFI, which has not been configured at Bearer Context Setup or Bearer Context Modification for a UE, and for which there is no QoS Flow to DRB mapping configured, has been received from a third network node (e.g. a UPF). In some embodiments, this first message is an E1AP DL DATA NOTIFICATION message.
- Determine that the unknown QFI received by the second network node has not been configured by a fourth network node (e.g. a SMF via the AMF) in any PDU Session Resource procedure triggered for this UE.
- Send a second message to the second network node indicating that the packets of the unknown QFI shall be discarded. In some embodiments, the second message is an existing E1AP BEARER CONTEXT MODIFICATION MESSAGE that is modified to contain the information that the unknown QFI shall be discarded. In alternative embodiments, the second message is a new E1AP message.
- Send a third message to the second network node indicating that the second network shall send an error indication to the third network node indicating that the packets are dropped due to unknown QFI(s) where unknown QFI(s) are included. In some embodiments, the second message also contains the indication that the second network node shall send an error indication to the third network node. In alternative embodiments, the third message is an existing E1AP BEARER CONTEXT MODIFICATION MESSAGE that is modified to contain an indication that the second network shall send an error indication to the third network node. In other alternative embodiments, the third message is a new E1AP message.

In the second network node, e.g. a gNB-CU-UP, the method can include one or more of the following steps:

- Receive from a third network node (e.g. a UPF) a QoS Flow (or a User Plane packet) with an unknown QFI, which has not been configured at Bearer Context Setup or Bearer Context Modification for a UE, and for which there is no QoS Flow to DRB mapping configured.
- Send a first message to the first network node (e.g. a gNB-CU-CP) indicating that a QoS Flow (or a User Plane packet) with an unknown QFI, which has not been configured at Bearer Context Setup or Bearer Context Modification for a UE, and for which there is no QoS Flow to DRB mapping configured, has been received from a third network node (e.g. a UPF). In some embodiments, this message is an E1AP DL DATA NOTIFICATION message.

In response to the first message, receive a second message from the first network node indicating that the packets of the unknown QFI shall be discarded. In some embodiments, the second message is an existing E1AP BEARER CONTEXT MODIFICATION MESSAGE that is modified to contain the information that the unknown QFI shall be discarded. In alternative embodiments, the second message is a new E1AP message.

Upon receiving the second message, discard all DL data belonging to the QoS Flow indicated in the second message.

In response to the first message, receive a third message from the first network node indicating that the second network node shall send an GTP-U error indication message or other GTP-U message to the third network node indicating that the packets is dropped due to unknown QFI(s), where the unknown QFI(s), and optionally the number of dropped packets (for charging correlation), are also included in the message. In some embodiments, the second message also contains the indication that the second network node shall send an error indication to the third network node. In some embodiments, the third message is an existing E1AP BEARER CONTEXT MODIFICATION MESSAGE that is modified to contain the indication that the second network shall send an error indication to the third network node. In alternative embodiments, the third message is a new E1AP message.

Upon receiving the third message, send a GTP-U error indication message or other GTP-U message to the third network node indicating that the received QoS Flow has not yet been configured by the Core Network in any of the already established PDU Session Resources. In some embodiments, the error indication is contained in the GTP-U extension header of the packets belonging to the QoS Flow.

In the third network node, e.g. a UPF, the method can include one or more of the following steps:

Send to the second network node a QoS Flow (or a User Plane packet) with an unknown QFI, which has not been configured at Bearer Context Setup or Bearer Context Modification for a UE, and for which there is no QoS Flow to DRB mapping configured.

Receive a GTP-U error indication message or other GTP-U message from the second network node indicating that the received QoS Flow has not yet been configured by the Core Network in any of the already established PDU Session Resources. In some embodiments, the error indication is contained in the GTP-U extension header of the packets belonging to the QoS Flow.

Stop sending UP packets from this QoS Flow to the second network node.

In case the third network node is acting as an Intermediate-UPF or a Visiting-UPF, the third network node shall forward the said indication to the PSA UPF or Home UPF respectively in a GTP-U error indication message or other GTP-U message.

The third network node notifies using PFCP Session Report request message to the fourth network node (e.g. a SMF) indicating that the received QoS Flow has not yet been configured by the Core Network in any of the already established PDU Session Resources, where the unknown QFI(s), and optionally the number of dropped packets (for charging correlation), are also included in the message.

In the fourth network node, e.g. a SMF, the method can include one or more of the following steps:

Receive a PFCP Session Report request message with the indication from the third network node that the received QoS Flow has not yet been configured by the Core Network in any of the already established PDU Session Resources, where the unknown QFI(s), and optionally the number of dropped packets (for charging correlation), are also included in the message.

In case the fourth network node is acting as an Intermediate-SMF or a Visiting-SMF, the fourth network node shall forward the said indication to the Anchor SMF or Home SMF respectively.

Based on the reception of the indication that the received QoS Flow has not yet been configured by the Core Network in any of the already established PDU Session Resources, the fourth network node triggers corrective measures, e.g. reconfigures the third or the first network node. The fourth network node, e.g. the SMF, may adjust charging data record for the PDU session.

Figure 4:
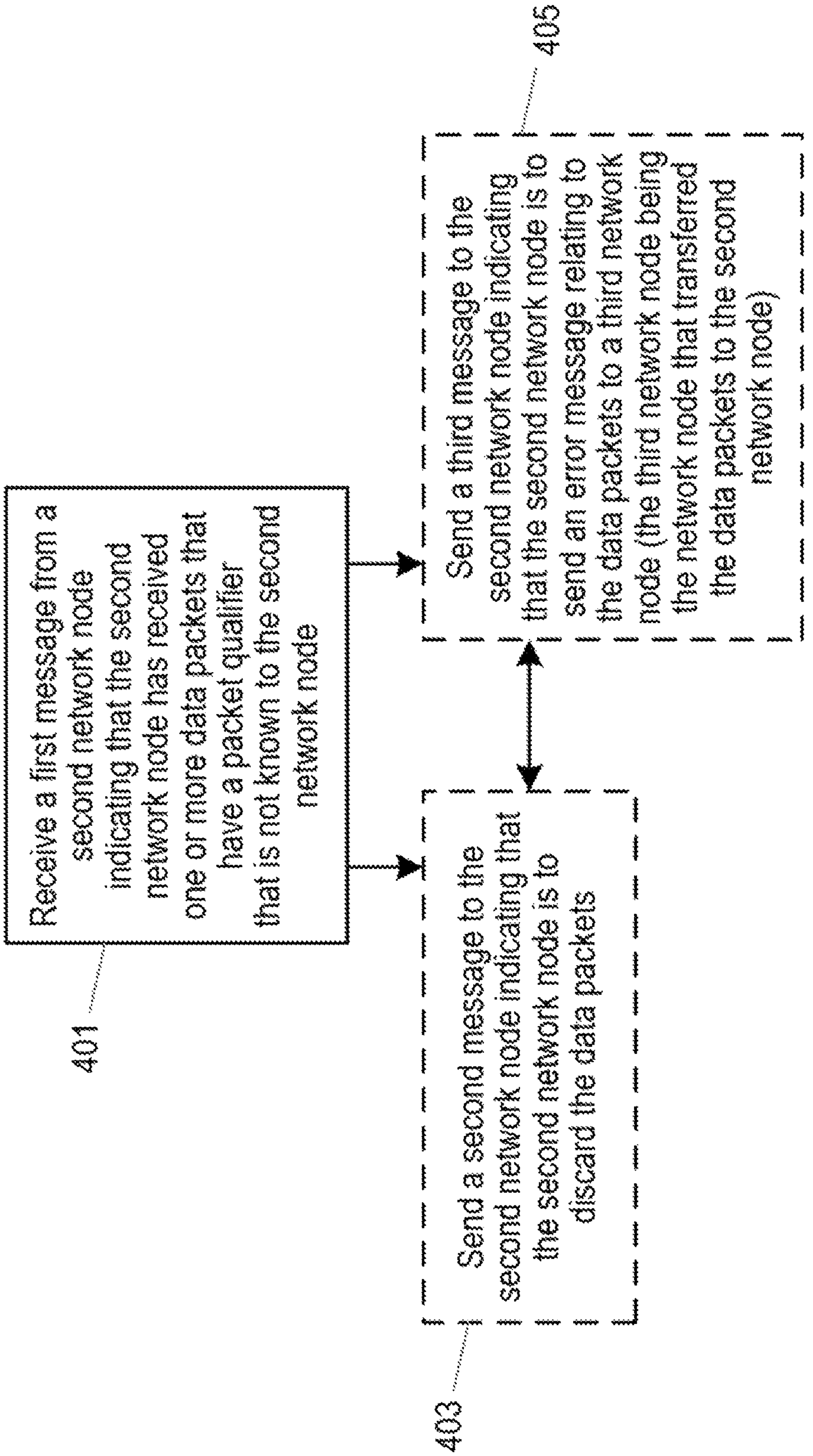
FIG. 4 is a flow chart illustrating a method performed by a first network node according to the user plane-based solution described herein.

The flow chart in FIG. 4 illustrates a general method performed by a first network node in a communication network according to the UP-based solution. As noted above, the first network node can be a CP entity of a CU in a base station, for example a gNB-CU-CP, a gNB-CU or a gNB.

The first network node may perform the method in response to executing suitably formulated computer readable code. The computer readable code may be embodied or stored on a computer readable medium, such as a memory chip, optical disc, or other storage medium. The computer readable medium may be part of a computer program product.

In step 401, the first network node receives a first message from a second network node (e.g. a UP entity of a CU in a base station, such as a gNB-CU-UP). The first message indicates that the second network node has received one or more data packets that have a packet qualifier that is not known to the second network node. The packet qualifier may be a QFI.

The first message can indicate that the packet qualifier has not been configured at PDU session resource setup, PDU session resource modification, Bearer Context Setup, or Bearer Context Modification for a UE to which the data packets are to be sent. The first message can also or alternatively indicate that no QoS Flow mapping to a resource bearer is configured for the packet qualifier.

The method in the first network node can comprise one or both of steps 403 and 405. In the event that both steps 403 and 405 are performed, the steps can be performed in any order.

In step 403, the first network node sends a second message to the second network node. The second message indicates that the second network node is to discard the data packets.

In step 405, the first network node sends a third message to the second network node. The third message indicates that the second network node is to send an error message relating to the data packets to a third network node (e.g. a user plane entity in the core network such as a UPF). The third network node is the network node that transferred the data packets to the second network node. The error message may indicate that the data packets have been discarded due to the packet qualifier not being known to the second network node.

After receiving the first message, the first network node can determine whether the packet qualifier for the data packets received by the second network node has been configured by a fourth network node (e.g. a session management node such as a SMF) that is responsible for configuring resources for QoS Flows. Steps 403 and/or 405 may be performed if it is determined that the packet qualifier has not been configured by the fourth network node.

Either or both of the second message and the third message mentioned above can be an E1AP BEARER CONTEXT MODIFICATION MESSAGE or a different E1AP message.

In some embodiments, the second message can further indicate that the second network node is to send the error message relating to the data packets to the third network node. In this case, the first network node may not perform step 405.

Figure 5:
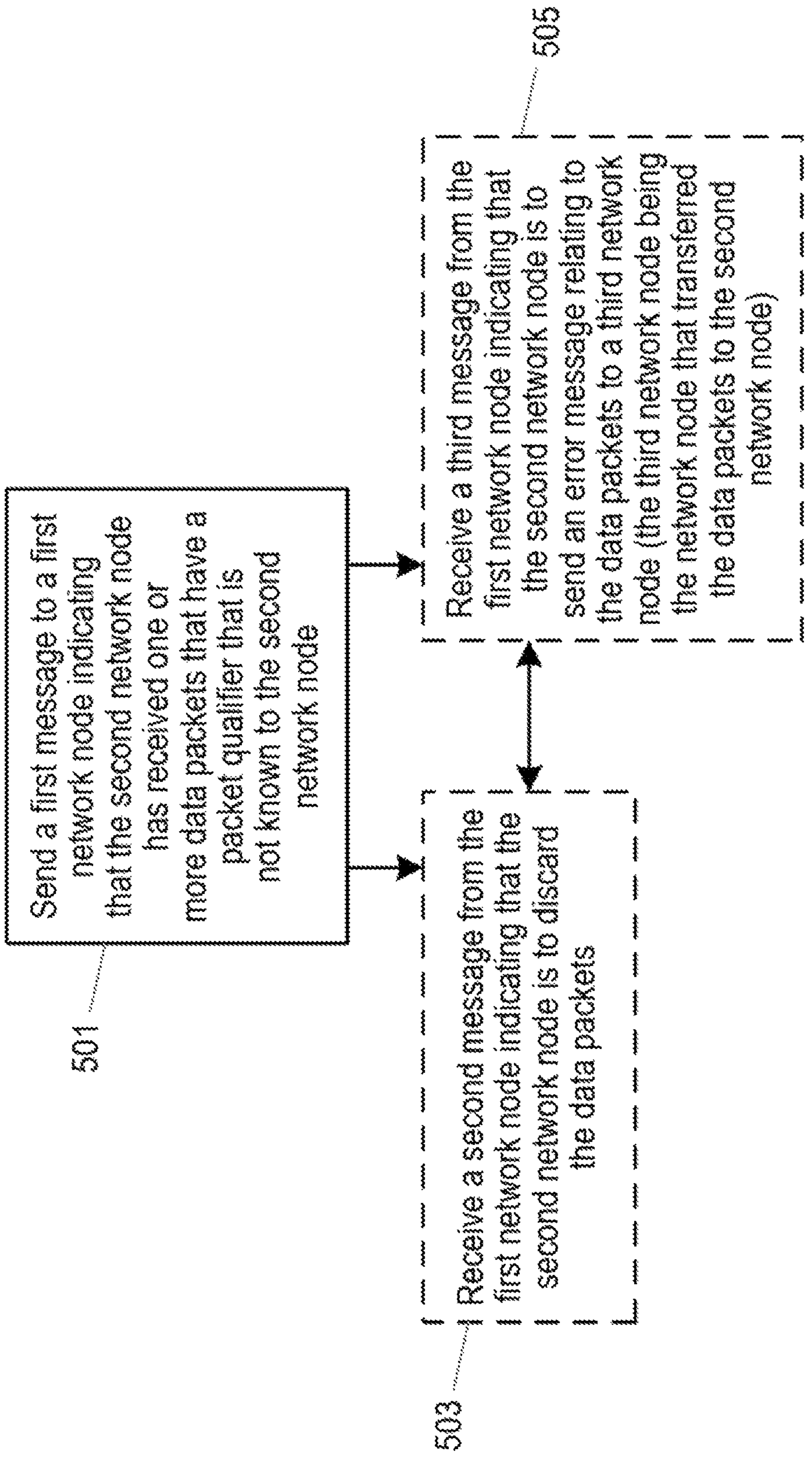
FIG. 5 is a flow chart illustrating a method performed by a second network node according to the user plane-based solution described herein.

The flow chart in FIG. 5 illustrates a general method performed by a second network node in a communication network according to the UP-based solution. As noted above, the second network node can be a UP entity of a CU in a base station, such as a gNB-CU-UP.

The second network node may perform the method in response to executing suitably formulated computer readable code. The computer readable code may be embodied or stored on a computer readable medium, such as a memory chip, optical disc, or other storage medium. The computer readable medium may be part of a computer program product.

Although not shown in FIG. 5, the method can start with the second network node receiving one or more data packets and a packet qualifier from a third network node (e.g. a user plane entity in the core network such as a UPF). The packet qualifier may be a QFI.

In step 501, the second network node sends a first message to a first network node (e.g. a CP entity of a CU in a base station, for example a gNB-CU-CP, a gNB-CU or a gNB). The first message indicates that the second network node has received one or more data packets that have a packet qualifier that is not known to the second network node.

The first message can indicate that the packet qualifier has not been configured at PDU session resource setup, PDU session resource modification, Bearer Context Setup, or Bearer Context Modification for a UE to which the data packets are to be sent. The first message can also or alternatively indicate that no QoS Flow mapping to a resource bearer is configured for the packet qualifier.

The method in the second network node can comprise one or both of steps 503 and 505. In the event that both steps 503 and 505 are performed, the steps can be performed in any order.

In step 503, the second network node receives a second message from the first network node. The second message indicates that the second network node is to discard the data packets. If the second network node receives the second message, the second network node can discard the received data packets.

In step 505, the second network node receives a third message from the first network node. The third message indicates that the second network node is to send an error message relating to the data packets to a third network node. The third network node is a network node that transferred the data packets to the second network node. The error message can be a GTP error indication message, a GTP-User plane, GTP-U message, or a GTP-U extension header.

In some embodiments, if the second network node receives the third message, the second network node can send the error message relating to said data packets to the third network node. The error message can indicate any one or more of: the packet qualifier; that the packet qualifier is not known to the second network node; that said data packets have been discarded due to the packet qualifier not being known to the second network node; that a QoS Flow corresponding to the packet qualifier has not been configured by a core network of the communication network; and a number of discarded data packets.

Either or both of the second message and the third message mentioned above can be an E1AP BEARER CONTEXT MODIFICATION MESSAGE or a different E1AP message.

In some embodiments, the second message can further indicate that the second network node is to send the error message relating to the data packets to the third network node. In this case, the second network node may not perform step 505.

Figure 6:
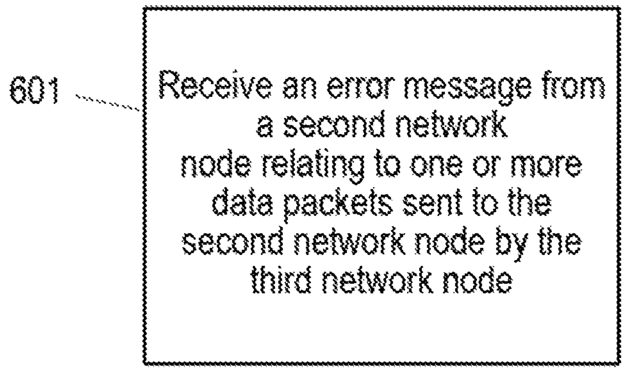
FIG. 6 is a flow chart illustrating a method performed by a third network node according to the user plane-based solution described herein.

The flow chart in FIG. 6 illustrates a general method performed by a third network node in a communication network according to the UP-based solution. As noted above, the third network node can be a UP entity in a core network of a communication network, such as a UPF.

The third network node may perform the method in response to executing suitably formulated computer readable code. The computer readable code may be embodied or stored on a computer readable medium, such as a memory chip, optical disc, or other storage medium. The computer readable medium may be part of a computer program product.

Although not shown in FIG. 6, the method can start with the third network node sending one or more data packets and a packet qualifier to a second network node (e.g. a UP entity of a CU in a base station, such as a gNB-CU-UP). The packet qualifier may be a QFI.

In step 601, the third network node receives an error message from the second network node relating to one or more data packets the third network node sent to the second network node. The error message indicates any of: a packet qualifier; that the packet qualifier is not known to the second network node; that the data packets have been discarded due to the packet qualifier not being known to the second network node; that a QoS Flow corresponding to the packet qualifier has not been configured by a core network of the communication network; and a number of data packets discarded by the second network node. The error message can be a GTP error indication message, a GTP-User plane, GTP-U message, or a GTP-U extension header.

The third network node may refrain from sending any further data packets to the second network node for a QoS Flow relating to the packet qualifier.

In some embodiments, the third network node can forward the error message to another network node. The forwarded error message can further comprise an indication of the number of data packets discarded by the third network node in response to the error message received from the second network node. The 'another network node' that the third network node forwards the error message to may be a PDU Session Anchor UPF.

The third network node may send a notification message to a fourth network node (e.g. a session management node such as a SMF) that indicates that a QoS Flow relating to the packet qualifier has not yet been configured. The notification message may further indicate any one or more of: the packet qualifier; a number of data packets discarded by the second network node; and/or a number of data packets discarded by the third network node in response to the error message received from the second network node. This notification message may be a PFCP Session Report request message.

Figure 7:
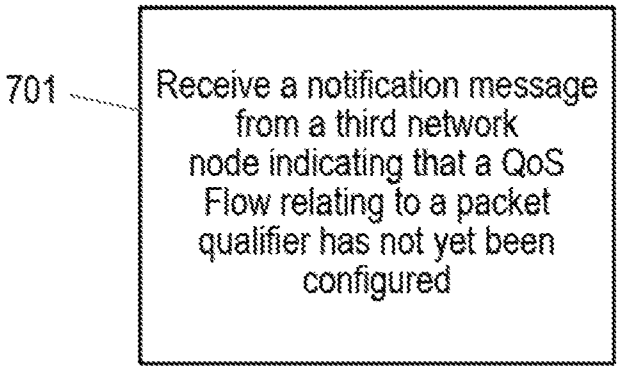
FIG. 7 is a flow chart illustrating a method performed by a fourth network node according to the user plane-based solution described herein.

The flow chart in FIG. 7 illustrates a general method performed by a fourth network node in a communication network according to the UP-based solution. As noted above, the fourth network node can be a session management node such as a SMF.

The fourth network node may perform the method in response to executing suitably formulated computer readable code. The computer readable code may be embodied or stored on a computer readable medium, such as a memory chip, optical disc, or other storage medium. The computer readable medium may be part of a computer program product.

In step 701, the fourth network node receives a notification message from a third network node (e.g. a UP entity in a core network of a communication network, such as a UPF). The notification message indicates that a QoS Flow relating to a packet qualifier has not yet been configured. The notification message can further indicate one or more of: the packet qualifier; a number of data packets discarded by a second network node; and/or a number of data packets discarded by the third network node in response to an error message received from the second network node. The notification message can be a PFCP Session Report request message. The packet qualifier may be a QFI.

The fourth network node may forward the notification message to another network node (e.g. a PDU Session Anchor UPF). In the forwarded notification message, the fourth network node may also indicate a number of data packets discarded by the third network node in response to an error message received from the second network node.

In some embodiments, in response to receiving the notification message in step 701, the fourth network node can trigger a reconfiguration of a first network node (e.g. a CP entity of a CU in a base station, for example a gNB-CU-CP, a gNB-CU or a gNB). The reconfiguration of the first network node and/or the third network node can be a PDU Session Resource modification procedure. In addition or alternatively, the fourth network node can trigger the third network node to configure the QoS Flow.

The following section sets out an exemplary implementation of the above solution in the 3GPP standard: 3GPP TS 37.483 v17.2.0. In the following section, MDT is "Minimization of Drive Test", SDAP is "Service Data Adaptation Protocol", SN is "Sequence Number", RRM is "Radio Resource Management", CHO is "Conditional Handover", IDC is "In-device Co-existence", and SCG is Secondary Cell Group 8.3.2 Bearer Context Modification (gNB-CU-CP initiated)

8.3.2.1 General

The purpose of the Bearer Context Modification procedure is to allow the gNB-CU-CP to modify a bearer context in the gNB-CU-UP. The procedure uses UE-associated signalling.

8.3.2.2 Successful Operation

Figure 8:
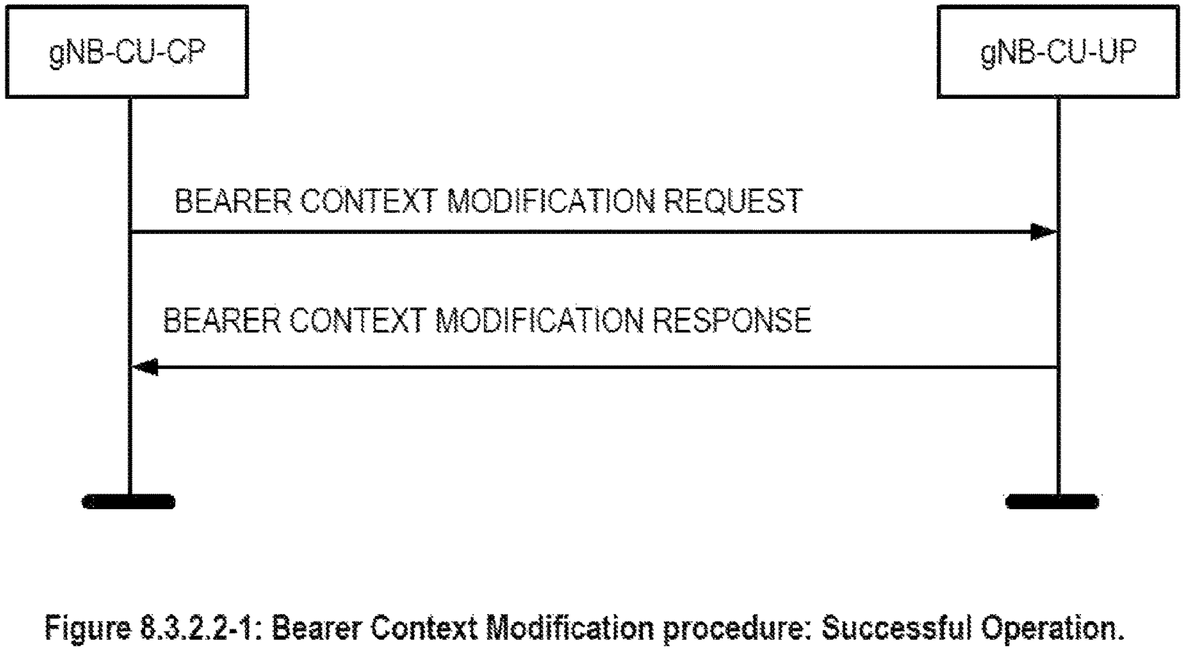
FIG. 8 is a signalling diagram illustrating Successful Operation of a Bearer Context Modification procedure.

[See FIG. 8]

The gNB-CU-CP initiates the procedure by sending the BEARER CONTEXT MODIFICATION REQUEST message to the gNB-CU-UP. If the gNB-CU-UP succeeds to modify the bearer context, it replies to the gNB-CU-CP with the BEARER CONTEXT MODIFICATION RESPONSE message.

<Text Omitted>

If the Management Based MDT PLMN Modification List IE is contained in the BEARER CONTEXT MODIFICATION REQUEST message, the gNB-CU-UP shall, if supported, overwrite any previously stored Management Based MDT PLMN List information in the UE context and use the received information to determine subsequent selection of the UE for management based MDT defined in TS 32.422 [24].

If the Discard and Notify IE is contained in the BEARER CONTEXT MODIFICATION REQUEST message, the gNB-CU-UP shall, if supported, discard all the received DL PDCP PDUs for all the QoS Flows indicated in the Discard and Notify IE, and send an error indication to the UPF, as described in TS 23.501 [20].

Interaction with the Bearer Context Modification (gNB-CU-CP Initiated)

If the BEARER CONTEXT MODIFICATION REQUEST message includes for a DRB in the DRB To Modify List IE the PDCP SN Status Request IE set to "requested" and if the gNB-CU-UP has not yet received a SDAP end marker packet for a QoS flow which has been previously re-configured to another DRB by means of a gNB-CU-CP initiated Bearer Context Modification procedure, the gNB-CU-UP shall includes the QoS Flow Identifier of that QoS flow in the Old QoS Flow List-UL End Marker expected IE in the PDU Session Resource Modified List IE in the BEARER CONTEXT MODIFICATION RESPONSE message.

9.2.2.1 Bearer Context Setup Request

This message is sent by the gNB-CU-CP to request the gNB-CU-UP to setup a bearer context.

Direction: gNB-CU-CP→gNB-CU-UP

| IE/Group Name | Presence | Range | IE type and reference | Semantics description |
|---|---|---|---|---|
| Message Type | M | | 9.3.1.1 | |
| gNB-CU-CP UE E1AP ID | M | | 9.3.1.4 | |
| Security Information | M | | 9.3.1.10 | |
| UE DL Aggregate Maximum Bit Rate | M | | Bit Rate 9.3.1.20 | |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. |
| Serving PLMN | M | | PLMN Identity 9.3.1.7 | |
| Activity Notification Level | M | | 9.3.1.67 | |
| UE Inactivity Timer | O | | Inactivity Timer 9.3.1.54 | Included if the Activity Notification Level is set to UE. |
| Bearer Context Status Change | O | | ENUMERATED (Suspend, Resume, . . . , ResumeforSDT) | Indicates the status of the Bearer Context. NOTE: This IE is not applicable to eNB-CP/eNB-UP and ng-eNB-CU-CP/ng-eNB-CU-UP |
| CHOICE System | M | | | |
| >E-UTRAN | | | | |

-continued

| | | | |
|---|---|---|---|
| >>DRB To Setup List | M | DRB To Setup List E-UTRAN 9.3.3.1 | |
| >>Subscriber Profile ID for RAT/Frequency priority | O | 9.3.1.69 | |
| >>Additional RRM Policy Index | O | 9.3.1.70 | |
| >NG-RAN | | | |
| >>PDU Session Resource To Setup List | M | 9.3.3.2 | |
| RAN UE ID | O | OCTET STRING (SIZE(8)) | |
| gNB-DU ID | O | 9.3.1.65 | Included whenever it is known by the gNB-CU-CP or by the ng-eNB-CU-CP |
| Trace Activation | O | 9.3.1.68 | |
| NPN Context Information | O | 9.3.1.84 | |
| Management Based MDT PLMN List | O | MDT PLMN List 9.3.1.89 | |
| CHO Initiation | O | ENUMERATED (True, . . . ) | |
| Additional Handover Information | O | ENUMERATED(Discard PDCP SN, . . . ) | If set to "Discard PDCP SN", indicates that the forwarded PDCP SNs have to be removed |
| Direct Forwarding Path Availability | O | 9.3.1.98 | |
| gNB-CU-UP UE E1AP ID | O | 9.3.1.5 | |
| MDT Polluted Measurement Indicator | O | ENUMERATED (IDC, no-IDC, . . . ) | Indication on whether MDT Measurement affect (e.g. IDC) is undertake or not. |
| UE Slice Maximum Bit Rate List | O | 9.3.1.102 | |
| SCG Activation Status | O | 9.3.1.105 | |
| Discard and Notify | O | QoS Flow List 9.3.1.12 | |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |

Control Plane (CP)-Based Solution:

Methods of operating a first network node, second network node, third network node and fourth network node according to the CP-based solution are set out below.

In the first network node, e.g. a gNB-CU-CP, a gNB-CU or gNB, the method can include one or more of the following steps:

Receive a first message from a second network node (e.g. gNB-CU-UP) indicating that a QoS Flow (or a User Plane packet) with an unknown QFI, which has not been configured at Bearer Context Setup or Bearer Context Modification for a UE, and for which there is no QoS Flow to DRB mapping configured, has been received from a third network node (e.g. a UPF), where the unknown QFI(s), and optionally the number of dropped packets (for charging correlation), are also included in the message. In some embodiments, this message is an E1AP DL DATA NOTIFICATION message.

Determine that the unknown QFI received by the second network node has not been configured by a fourth network node (e.g. a SMF via AMF) in any PDU Session Resource procedure triggered for this UE.

Send a second message to the second network node indicating that the packets of the unknown QFI shall be discarded. In some embodiments, the second message is an existing E1AP BEARER CONTEXT MODIFICATION MESSAGE that is modified to contain the information that the unknown QFI shall be discarded. In alternative embodiments, the second message is a new E1AP message.

Send a third message to the fourth network node indicating that an unknown QoS Flow (i.e. not mapped to any of the already established PDU Session Resource) has been received. In some embodiments, the third message is an existing NGAP PDU RESOURCE SESSION NOTIFY that is modified to contain an indication that an unknown QoS Flow (i.e. not mapped to any of the already established PDU Session Resources) has been received. In alternative embodiments, the third message is a new NGAP message.

In the second network node, e.g. a gNB-CU-UP, the method can include one or more of the following steps:

Receive from a third network node (e.g. a UPF) a QoS Flow (or a User Plane packet) with an unknown QFI, which has not been configured at Bearer Context Setup or Bearer Context Modification for a UE, and for which there is no QoS Flow to DRB mapping configured.

Send a first message to the first network node (e.g. a gNB-CU-CP) indicating that a QoS Flow (or a User Plane packet) with an unknown QFI, which has not been configured at Bearer Context Setup or Bearer Context Modification for a UE, and for which there is no QoS Flow to DRB mapping configured, has been received from a third network node (e.g. a UPF). In some embodiments, this message is an E1AP DL DATA NOTIFICATION message.

In response to the first message, receive a second message from the first network node indicating that the packets of the unknown QFI shall be discarded. In some embodiments, the second message is an existing BEARER CONTEXT MODIFICATION MESSAGE that is modified to contain the information that the unknown QFI shall be discarded. In alternative embodiments, the second message is a new E1AP message.

Upon receiving the second message, discard all DL data belonging to the QoS Flow indicated in the second message.

In the fourth network node, e.g. a SMF via an AMF, the method can include one or more of the following steps:

Receive a third message from the first network node indicating that an unknown QoS Flow (i.e. not mapped to any of the already established PDU Session Resources) has been received, where the unknown QFI(s), and optionally the number of dropped packets (for charging correlation), are also included in the message. In some embodiments, the third message is an existing NGAP PDU RESOURCE SESSION NOTIFY message that is modified to contain an indication that an unknown QoS Flow (i.e. not mapped to any of the already established PDU Session Resource) has been received. In alternative embodiments, the indication is a new codepoint in the NGAP Notification Cause IE contained in the NGAP PDU Session Resource Notify Transfer IE. In other alternative embodiments, the indication is a new IE contained in the NGAP PDU RESOURCE SESSION NOTIFY message. In some embodiments, the third message is a new NGAP message.

In case the fourth network node is an Intermediate-SMF or a Visiting-SMF, the fourth network node shall forward the said indication to the Anchor SMF or Home SMF respectively.

Based on the reception of the indication that an unknown QoS Flow (i.e. not mapped to any of the already established PDU Session Resource) has been received, trigger corrective measures, e.g. reconfigure the third network node (e.g. a UPF) or the first network node. The fourth network node, e.g. the SMF, may adjust charging data record for the PDU session.

Figure 9:
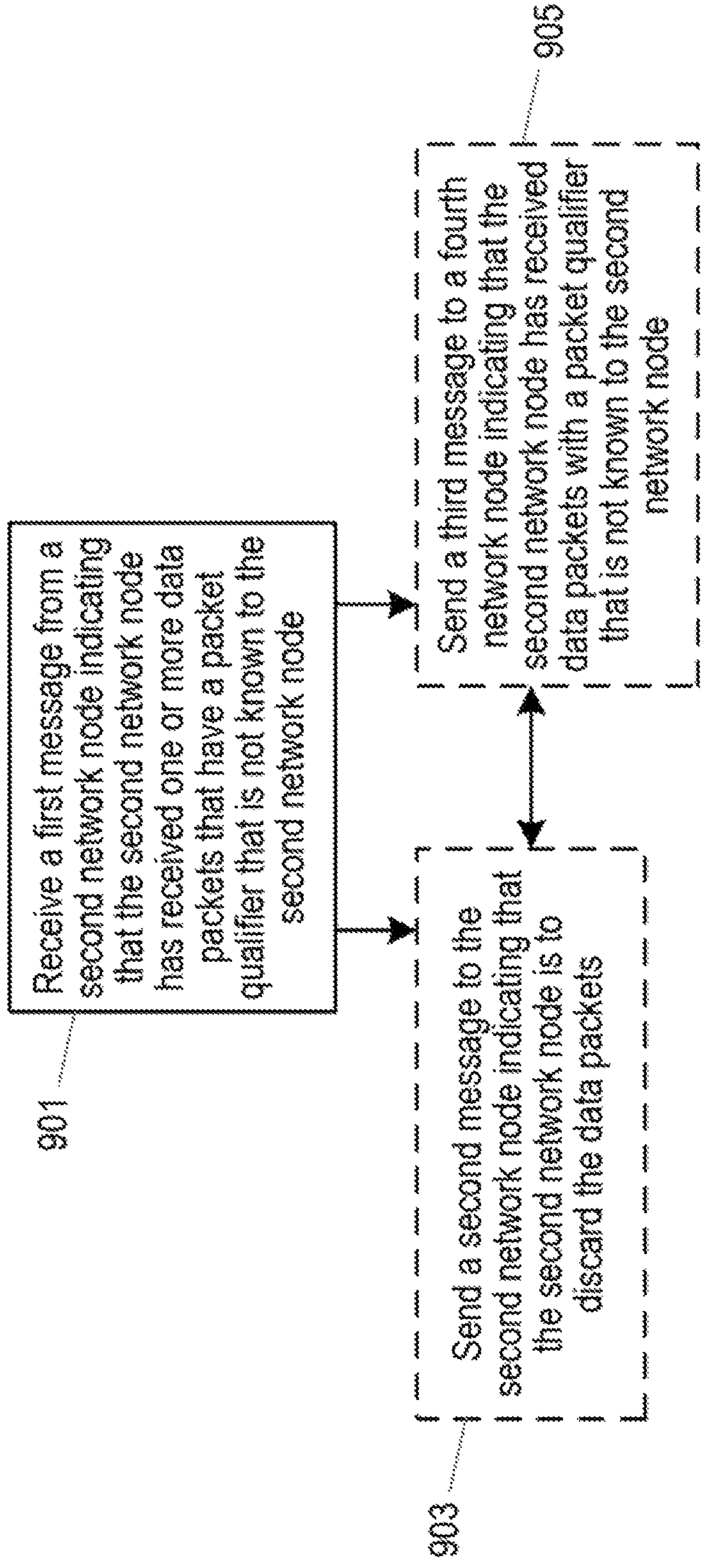
FIG. 9 is a flow chart illustrating a method performed by a first network node according to the control plane-based solution described herein.

The flow chart in FIG. 9 illustrates a general method performed by a first network node in a communication network according to the CP-based solution. As noted above, the first network node can be a CP entity of a CU in a base station, for example a gNB-CU-CP, a gNB-CU or a gNB.

The first network node may perform the method in response to executing suitably formulated computer readable code. The computer readable code may be embodied or stored on a computer readable medium, such as a memory chip, optical disc, or other storage medium. The computer readable medium may be part of a computer program product.

In step 901, the first network node receives a first message from a second network node (e.g. a UP entity of a CU in a base station, such as a gNB-CU-UP). The first message indicates that the second network node has received one or more data packets that have a packet qualifier that is not known to the second network node. The packet qualifier may be a QFI.

The first message can indicate that the packet qualifier has not been configured at PDU session resource setup, PDU session resource modification, Bearer Context Setup, or Bearer Context Modification for a UE to which the data packets are to be sent. The first message can also or alternatively indicate that no QoS Flow mapping to a resource bearer is configured for the packet qualifier.

The method in the first network node can comprise one or both of steps 903 and 905. In the event that both steps 903 and 905 are performed, the steps can be performed in any order.

In step 903, the first network node sends a second message to the second network node. The second message indicates that the second network node is to discard the data packets. The second message can be an E1AP BEARER CONTEXT MODIFICATION MESSAGE or a different E1AP message.

In step 905, the first network node sends a third message to a fourth network node. The third message indicates that the second network node has received data packets with a packet qualifier that is not known to the second network node. The fourth network node is a network node that is responsible for configuring resources for QoS Flows, and can be, for example, a session management node such as a SMF. The third message may further indicate the packet qualifier and/or a number of data packets to be discarded by the second network node. The third message can a PDU Session Resource Notify or a NGAP message.

In some embodiments, after receiving the first message in step 901, the first network node can determine whether the packet qualifier for the data packets received by the second network node has been configured by the fourth network node. In some embodiments, step 903 and/or 905 is performed if it is determined that the packet qualifier has not been configured by the fourth network node.

Figure 10:
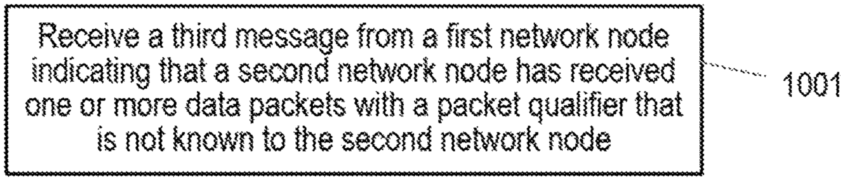
FIG. 10 is a flow chart illustrating a method performed by a fourth network node according to the control plane-based solution described herein.

The flow chart in FIG. 10 illustrates a general method performed by a fourth network node in a communication network according to the CP-based solution. As noted above, the fourth network node can be a session management node such as a SMF.

The fourth network node may perform the method in response to executing suitably formulated computer readable code. The computer readable code may be embodied or stored on a computer readable medium, such as a memory chip, optical disc, or other storage medium. The computer readable medium may be part of a computer program product.

In step 1001, the fourth network node receives a third message from a first network node (e.g. a CP entity of a CU in a base station, for example a gNB-CU-CP, a gNB-CU or a gNB). The third message indicates that a second network node (e.g. a UP entity of a CU in a base station, such as a gNB-CU-UP) has received one or more data packets with a packet qualifier that is not known to the second network node. The packet qualifier may be a QFI. The third message can be a PDU Session Resource Notify or a NGAP message. In the latter case, the third message can a codepoint in a NGAP Notification Cause IE contained in a NGAP PDU Session Resource Notify Transfer IE.

The third message may further indicate the packet qualifier and/or a number of data packets discarded by the second network node.

In some embodiments, the fourth network node may forward the third message (or the content of the third message) to another network node.

The fourth network node may, in response to receiving the third message, trigger a reconfiguration of the first network node and/or a third network node to configure the QoS Flow. The reconfiguration of the first network node and/or the third network node can be a PDU Session Resource modification procedure.

The following section sets out an exemplary implementation of the third message of the above CP-based solution in the 3GPP standard: 3GPP TS 37.413 v17.2.0.

9.3.4.5 PDU Session Resource Notify Transfer

This IE is transparent to the AMF.

| IE/Group Name | Presence | Range | IE type and reference | Semantics description | Criticality | Assigned Criticality |
|---|---|---|---|---|---|---|
| QoS Flow Notify List | | 0 . . . 1 | | | — | |
| >QoS Flow Notify Item | | 1 . . <maxnoofQoSFlows> | | | — | |
| >>QoS Flow Identifier | M | | 9.3.1.51 | | — | |
| >>Notification Cause | M | | ENUMERATED (fullfilled, not fulfilled, . . . , unknown QoS Flow) | | — | |
| >>Current QoS Parameters Set Index | O | | Alternative QoS Parameters Set Notify Index 9.3.1.153 | Index to the currently fulfilled alternative QoS parameters set. Value 0 indicates that NG-RAN cannot even fulfil the lowest alternative parameters set. | YES | Ignore |
| QoS Flow Released List | O | | QoS Flow List with Cause 9.3.1.13 | | — | |
| Secondary RAT Usage Information | O | | 9.3.1.114 | | YES | ignore |
| QoS Flow Feedback List | | 0 . . . 1 | | | YES | ignore |
| >QoS Flow Feedback Item | | 1 . . . <maxnoofQoSFlows> | | | — | |
| >>QoS Flow Identifier | M | | 9.3.1.51 | | | |
| >>Update Feedback | O | | BIT STRING { {CN PDB DL(0), CN PDB UL(1)} (SIZE(8, . . .)) | Each position in the bitmap represents a QoS parameter. If a bit is set to "1", the respective parameter was not updated. If a bit is set to "0", the respective parameter was successfully updated. Bits 2-7 reserved for future use. | — | |
| >>CN Packet Delay Budget Downlink | O | | Extended Packet Delay Budget 9.3.1.135 | Indicates when the packet delay budget downlink was not updated in path switch that NG-RAN can offer this value | — | |
| >>CN Packet Delay Budget Uplink | O | | Extended Packet Delay Budget 9.3.1.135 | Indicates when the packet delay budget uplink was not updated in path switch that NG-RAN can offer this value | — | |

| Range bound | Explanation |
|---|---|
| maxnoofQoSFlows | Maximum no. of QoS flows allowed within one PDU session. Value is 64. |

Figure 11:
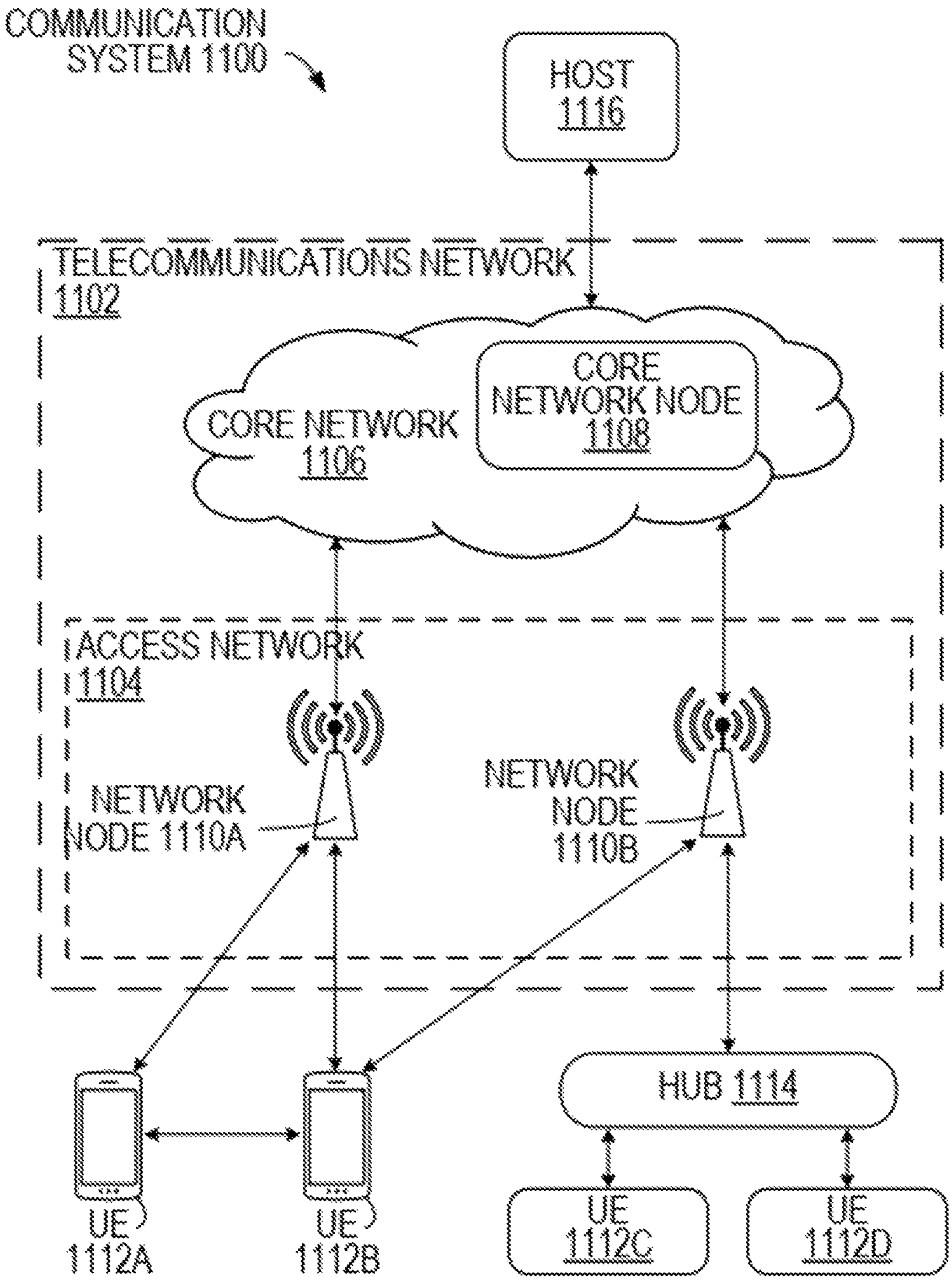
FIG. 11 shows an example of a communication system in accordance with some embodiments.

FIG. 11 shows an example of a communication system 1100 in accordance with some embodiments.

In the example, the communication system 1100 includes a telecommunication network 1102 that includes an access network 1104, such as a radio access network (RAN), and a core network 1106, which includes one or more core network nodes 1108. The access network 1104 includes one or more access network nodes, such as access network nodes 1110*a* and 1110*b* (one or more of which may be generally referred to as access network nodes 1110), or any other similar 3rd Generation Partnership Project (3GPP) access node or non-3GPP access point. The access network nodes 1110 facilitate direct or indirect connection of wireless devices (also referred to interchangeably herein as user equipment (UE), such as by connecting UEs 1112*a*, 1112*b*, 1112*c*, and 1112*d* (one or more of which may be generally referred to as UEs 1112) to the core network 1106 over one or more wireless connections. The access network nodes 1110 may be, for example, access points (APs) (e.g. radio access points), base stations (BSs) (e.g. radio base stations, Node Bs, evolved Node Bs (eNBs) and NR NodeBs (gNBs).

Unless otherwise indicated, the term 'network node' is used herein to refer to both access network nodes 1110 and core network nodes 1108

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The wireless devices/UEs 1112 may be any of a wide variety of communication devices, including wireless devices arranged, configured, and/or operable to communicate wirelessly with the network nodes 1110 and other communication devices. Similarly, the access network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

The core network 1106 may connect the access network nodes 1110 to one or more hosts, such as host 1116. These connections may be direct or indirect via one or more intermediary networks or devices. In other examples, network nodes may be directly coupled to hosts. The core network 1106 includes one more core network nodes (e.g. core network node 1108) that are structured with hardware and software components. Features of these components may be substantially similar to those described with respect to the wireless devices/UEs, access network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier Deconcealing function (SIDF), Unified Data Management (UDM), Security Edge Protection Proxy (SEPP), Network Exposure Function (NEF), and/or a User Plane Function (UPF).

The host 1116 may be under the ownership or control of a service provider other than an operator or provider of the access network 1104 and/or the telecommunication network 1102, and may be operated by the service provider or on behalf of the service provider. The host 1116 may host a variety of applications to provide one or more services. Examples of such applications include the provision of live and/or pre-recorded audio/video content, data collection services, for example, retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 11 enables connectivity between the wireless devices/UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g. 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1102 is a cellular network that implements 3GPP standardized features. Accordingly, the telecommunications network 1102 may support network slicing to provide different logical networks to different devices that are connected to the telecommunication network 1102. For example, the telecommunications network 1102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example illustrated in FIG. 11, the hub 1114 communicates with the access network 1104 to facilitate indirect communication between one or more UEs (e.g. UE 1112*c* and/or 1112*d*) and access network nodes (e.g. access network node 1110*b*). In some examples, the hub 1114 may be a controller, router, a content source and analytics node, or any of the other communication devices described herein regarding UEs.

Figure 12:
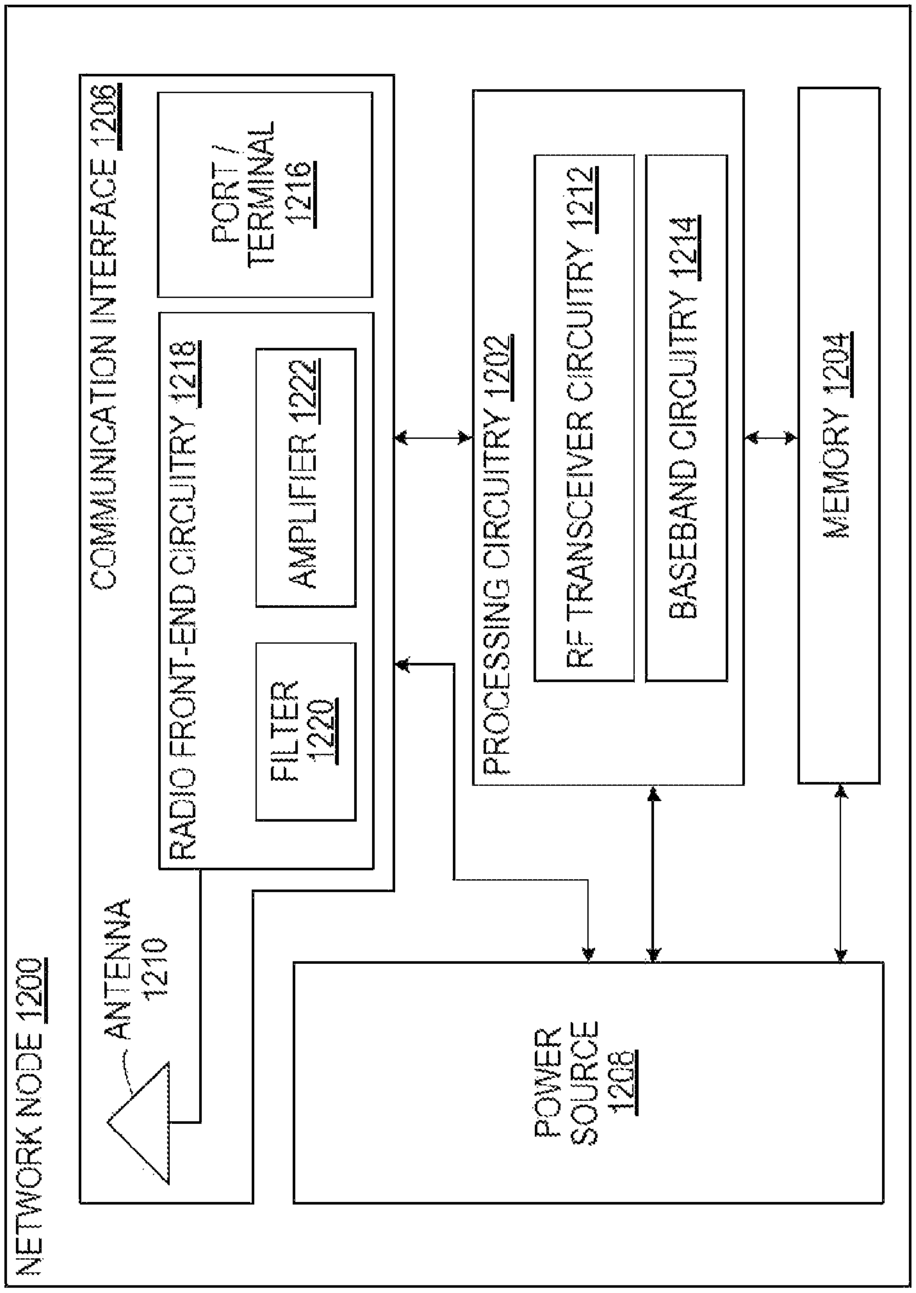
FIG. 12 shows a network node in accordance with some embodiments.

FIG. 12 shows a network node 1200 in accordance with some embodiments.

As used herein, network node refers to equipment capable, configured, arranged and/or operable to communicate directly or indirectly with a UE and/or with other network nodes or equipment, in a telecommunication network. As noted above, examples of network nodes include, but are not limited to, access network nodes such as access points (APs) (e.g. radio access points), base stations (BSs) (e.g. radio base stations, Node Bs, evolved Node Bs (eNBs), NR NodeBs (gNBs)), and individual entities in a CU-UP split base station. Other examples of network nodes include, but are not limited to, core network nodes such as nodes that include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g. Evolved Serving Mobile Location Centers (E-SMLCs)), and/or Minimization of Drive Tests (MDTs).

The network node 1200 includes processing circuitry 1202, a memory 1204, a communication interface 1206, and a power source 1208, and/or any other component, or any combination thereof. The network node 1200 may be composed of multiple physically separate components (e.g. a NodeB component and a RNC component, or a BTS component and a BSC component, etc.), which may each have their own respective components. In certain scenarios in which the network node 1200 comprises multiple separate components (e.g. BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1200 may be configured to support multiple radio access technologies (RATs). In such embodiments, some components may be duplicated (e.g. separate memory 1204 for different RATs) and some components may be reused (e.g. a same antenna 1210 may be shared by different RATs). The network node 1200 may also include multiple sets of the various illustrated components for different wireless technologies integrated into network node 1200, for example Global System for Mobile Communications (GSM), Wideband Code Division Multiple Access (WCDMA), Long Term Evolution (LTE), NR, WiFi, Zigbee, Z-wave, LoRaWAN, Radio Frequency Identification (RFID) or Bluetooth wireless technologies. These wireless technologies may be integrated into the same or different chip or set of chips and other components within network node 1200.

The processing circuitry 1202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1200 components, such as the memory 1204, to provide network node 1200 functionality. For example, the processing circuitry 1202 may be configured to cause the network node to perform the methods described herein.

In some embodiments, the processing circuitry 1202 includes a system on a chip (SOC). In some embodiments, the processing circuitry 1202 includes one or more of radio frequency (RF) transceiver circuitry 1212 and baseband processing circuitry 1214. In some embodiments, the radio frequency (RF) transceiver circuitry 1212 and the baseband processing circuitry 1214 may be on separate chips (or sets of chips), boards, or units, such as radio units and digital units. In alternative embodiments, part or all of RF transceiver circuitry 1212 and baseband processing circuitry 1214 may be on the same chip or set of chips, boards, or units.

The memory 1204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD), and/or any other volatile or non-volatile, non-transitory device-readable and/or computer-executable memory devices that store information, data, and/or instructions that may be used by the processing circuitry 1202. The memory 1204 may store any suitable instructions, data, or information, including a computer program, software, an application including one or more of logic, rules, code, tables, and/or other instructions capable of being executed by the processing circuitry 1202 and utilized by the network node 1200. The memory 1204 may be used to store any calculations made by the processing circuitry 1202 and/or any data received via the communication interface 1206. In some embodiments, the processing circuitry 1202 and memory 1204 is integrated.

The communication interface 1206 is used in wired or wireless communication of signalling and/or data between network nodes, the access network, the core network, and/or a UE. As illustrated, the communication interface 1206 comprises port(s)/terminal(s) 1216 to send and receive data, for example to and from a network over a wired connection.

In embodiments where the network node 1200 is an access network node, the communication interface 1206 also includes radio front-end circuitry 1218 that may be coupled to, or in certain embodiments a part of, the antenna 1210. In embodiments where the network node 1200 is a CU entity of a CU-DU split base station, or the network node 1200 is a core network node, the network node 1200 may not include radio front-end circuitry 1218 and antenna 1210. Radio front-end circuitry 1218 comprises filters 1220 and amplifiers 1222. The radio front-end circuitry 1218 may be connected to an antenna 1210 and processing circuitry 1202. The radio front-end circuitry may be configured to condition signals communicated between antenna 1210 and processing circuitry 1202. The radio front-end circuitry 1218 may receive digital data that is to be sent out to other network nodes or UEs via a wireless connection. The radio front-end circuitry 1218 may convert the digital data into a radio signal having the appropriate channel and bandwidth parameters using a combination of filters 1220 and/or amplifiers 1222. The radio signal may then be transmitted via the antenna 1210. Similarly, when receiving data, the antenna 1210 may collect radio signals which are then converted into digital data by the radio front-end circuitry 1218. The digital data may be passed to the processing circuitry 1202. In other embodiments, the communication interface may comprise different components and/or different combinations of components.

In certain alternative embodiments, the access network node 1200 does not include separate radio front-end circuitry 1218, instead, the processing circuitry 1202 includes radio front-end circuitry and is connected to the antenna 1210. Similarly, in some embodiments, all or some of the RF transceiver circuitry 1212 is part of the communication interface 1206. In still other embodiments, the communication interface 1206 includes one or more ports or terminals 1216, the radio front-end circuitry 1218, and the RF transceiver circuitry 1212, as part of a radio unit (not shown), and the communication interface 1206 communicates with the baseband processing circuitry 1214, which is part of a digital unit (not shown).

The antenna 1210 may include one or more antennas, or antenna arrays, configured to send and/or receive wireless signals. The antenna 1210 may be coupled to the radio front-end circuitry 1218 and may be any type of antenna capable of transmitting and receiving data and/or signals wirelessly. In certain embodiments, the antenna 1210 is separate from the network node 1200 and connectable to the network node 1200 through an interface or port.

The antenna 1210, communication interface 1206, and/or the processing circuitry 1202 may be configured to perform any receiving operations and/or certain obtaining operations described herein as being performed by the network node. Any information, data and/or signals may be received from a UE, another network node and/or any other network equipment. Similarly, the antenna 1210, the communication interface 1206, and/or the processing circuitry 1202 may be configured to perform any transmitting operations described herein as being performed by the network node. Any information, data and/or signals may be transmitted to a UE, another network node and/or any other network equipment.

The power source 1208 provides power to the various components of network node 1200 in a form suitable for the respective components (e.g. at a voltage and current level needed for each respective component). The power source 1208 may further comprise, or be coupled to, power management circuitry to supply the components of the network node 1200 with power for performing the functionality described herein. For example, the network node 1200 may be connectable to an external power source (e.g. the power grid, an electricity outlet) via an input circuitry or interface such as an electrical cable, whereby the external power source supplies power to power circuitry of the power source 1208. As a further example, the power source 1208 may comprise a source of power in the form of a battery or battery pack which is connected to, or integrated in, power circuitry. The battery may provide backup power should the external power source fail.

Embodiments of the network node 1200 may include additional components beyond those shown in FIG. 12 for providing certain aspects of the network node's functionality, including any of the functionality described herein and/or any functionality necessary to support the subject matter described herein. For example, the network node 1200 may include user interface equipment to allow input of information into the network node 1200 and to allow output of information from the network node 1200. This may allow a user to perform diagnostic, maintenance, repair, and other administrative functions for the network node 1200.

Figure 13:
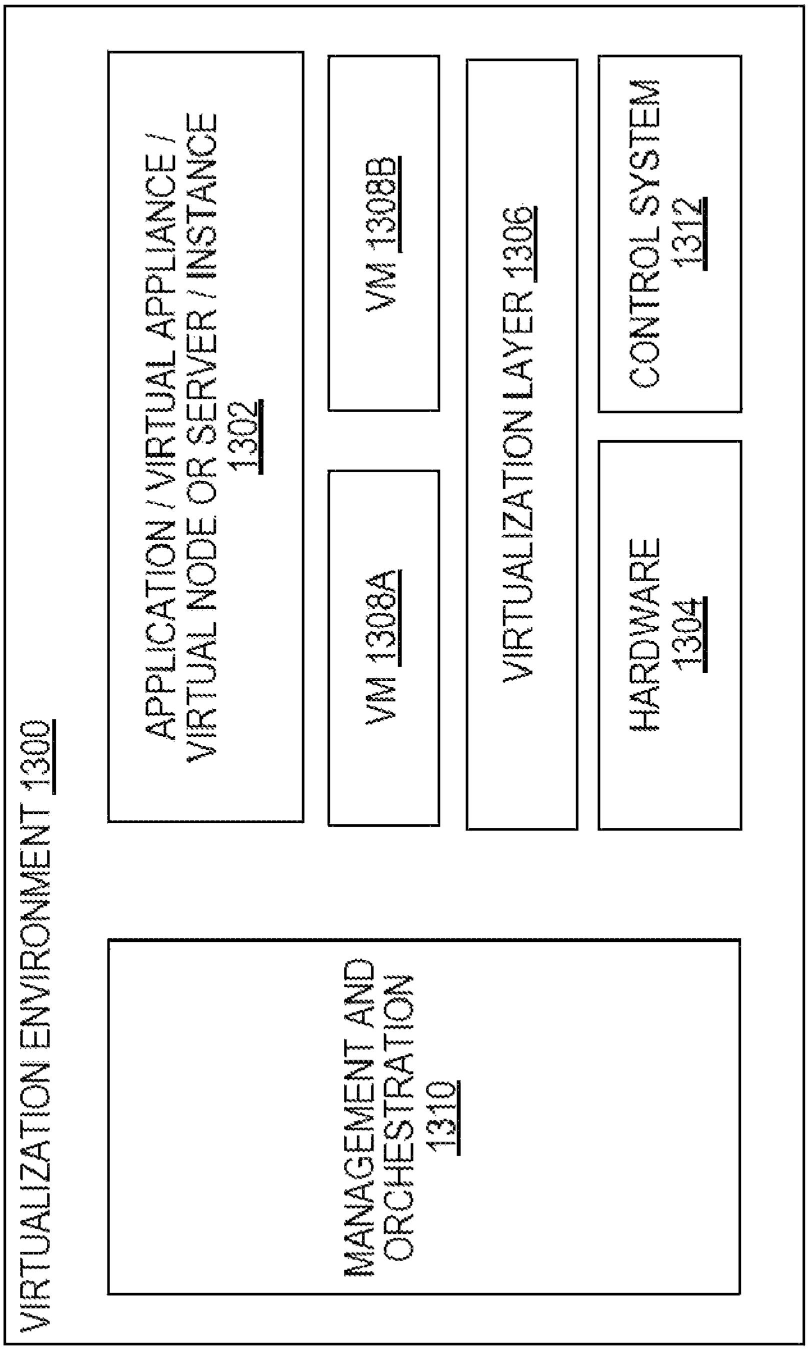
FIG. 13 is a block diagram illustrating a virtualization environment in which functions implemented by some embodiments may be virtualized.

FIG. 13 is a block diagram illustrating a virtualization environment 1300 in which functions implemented by some embodiments may be virtualized.

In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1300 hosted by one or more of hardware nodes, such as a hardware computing device that operates as an access network node, one or more entities in a CU-DU split base station, a wireless device/UE, or a core network node. Further, in embodiments in which the virtual node does not require radio connectivity (e.g. a CU in a base station, or a core network node), then the node may be entirely virtualized.

Applications 1302 (which may alternatively be called software instances, virtual appliances, network functions, virtual nodes, virtual network functions, etc.) are run in the virtualization environment 1300 to implement some of the features, functions, and/or benefits of some of the embodiments disclosed herein.

Hardware 1304 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1306 (also referred to as hypervisors or virtual machine monitors (VMMs), provide VMs 1308*a* and 1308*b* (one or more of which may be generally referred to as VMs 1308), and/or perform any of the functions, features and/or benefits described in relation with some embodiments described herein. The virtualization layer 1306 may present a virtual operating platform that appears like networking hardware to the VMs 1308.

The VMs 1308 comprise virtual processing, virtual memory, virtual networking or interface and virtual storage, and may be run by a corresponding virtualization layer 1306. Different embodiments of the instance of a virtual appliance 1302 may be implemented on one or more of VMs 1308, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1308 may be a software implementation of a physical machine that runs programs as if they were executing on a physical, non-virtualized machine. Each of the VMs 1308, and that part of hardware 1304 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1308 on top of the hardware 1304 and corresponds to the application 1302.

Hardware 1304 may be implemented in a standalone network node with generic or specific components. Hardware 1304 may implement some functions via virtualization.

Alternatively, hardware 1304 may be part of a larger cluster of hardware (e.g. such as in a data center or CPE) where many hardware nodes work together and are managed via management and orchestration 1310, which, among others, oversees lifecycle management of applications 1302. In some embodiments, hardware 1304 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signalling can be provided with the use of a control system 1312 which may alternatively be used for communication between hardware nodes and radio units.

Although the computing devices described herein (e.g. the various types of network nodes) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A method performed by a first network node in a communication network, the method comprising:

receiving a first message from a second network node, wherein the first message indicates that the second network node has received one or more data packets that have a packet qualifier that is not known to the second network node;

wherein the method further comprises one or both of:

(i) sending a second message to the second network node, wherein the second message indicates that the second network node is to discard said one or more data packets; and (ii) sending a third message to the second network node, wherein the third message indicates that the second network node is to send an error message relating to said one or more data packets to a third network node, wherein the third network node is a network node that transferred said one or more data packets to the second network node.

2. The method of claim 1, wherein the method further comprises:

after receiving the first message, determining whether the packet qualifier for said one or more data packets received by the second network node has been configured by a fourth network node that is responsible for configuring resources for Quality of Service (QoS) Flows.

3. The method of claim 2, wherein sending the second message, sending the third message, or sending both the second message and the third message, are performed when it is determined that the packet qualifier has not been configured by the fourth network node.

4. The method of claim 1, wherein the first message indicates that:

(a) the packet qualifier has not been configured at Protocol Data Unit (PDU) session resource setup, PDU session resource modification, Bearer Context Setup or Bearer Context Modification for a UE to which said one or more data packets are to be sent, (b) no Quality of Service (QoS) Flow mapping to a resource bearer is configured for the packet qualifier, or (c) both (a) and (b) above.

5. The method of claim 1, wherein the error message is to indicate that said one or more data packets have been discarded due to the packet qualifier not being known to the second network node.

6. The method of claim 1, wherein the second message, the third message, or both the second message and the third message, is an E1 Application Protocol (AP) BEARER CONTEXT MODIFICATION MESSAGE or a different E1AP message.

7. The method of claim 1, wherein the second message further indicates that the second network node is to send the error message relating to said one or more data packets to the third network node.

8. The method of claim 1, wherein:

the first network node is a control plane (CP) entity of a central unit (CU) in a base station;

the second network node is a user plane (UP) entity of a CU in a base station;

the third network node is a user plane entity in a core network of the communication network, or any combination thereof.

9. The method of claim 8, wherein:

the first network node is a gNB-CU-CP, a gNB-CU or a gNB;

the second network node is a gNB-CU-UP;

the third network node is a User Plane Function (UPF); or any combination thereof.

10. A method performed by a second network node in a communication network, the method comprising:

sending a first message to a first network node, wherein the first message indicates that the second network node has received one or more data packets that have a packet qualifier that is not known to the second network node;

wherein the method further comprises one or both of:

(i) receiving a second message from the first network node, wherein the second message indicates that the second network node is to discard said one or more data packets; and (ii) receiving a third message from the first network node, wherein the third message indicates that the second network node is to send an error message relating to said one or more data packets to a third network node, wherein the third network node is a network node that transferred said one or more data packets to the second network node.

11. The method of claim 10, wherein the method further comprises:

receiving the one or more data packets and the packet qualifier from the third network node.

12. The method of claim 10, wherein the first message indicates that:

(a) the packet qualifier has not been configured at Protocol Data Unit (PDU) session resource setup, PDU session resource modification, Bearer Context Setup or Bearer Context Modification for a UE to which said one or more data packets are to be sent, (b) no Quality of Service (QoS) Flow mapping to a resource bearer is configured for the packet qualifier, or (c) both (a) and (b) above.

13. The method of claim 10, wherein the method further comprises:

after receiving the second message, discarding said one or more data packets.

14. The method of claim 10, wherein the method further comprises:

after receiving the third message, sending the error message relating to said one or more data packets to the third network node, wherein the error message indicates any of:

the packet qualifier;

that the packet qualifier is not known to the second network node;

that said one or more data packets have been discarded due to the packet qualifier not being known to the second network node;

that a Quality of Service (QoS) Flow corresponding to the packet qualifier has not been configured by a core network of the communication network; and a number of discarded data packets.

15. The method of claim 10, wherein the second message, the third message, or both the second message and the third message, is an E1Application Protocol (AP) BEARER CONTEXT MODIFICATION MESSAGE or a different E1 Application Protocol (AP) message.

16. The method of claim 10, wherein the second message further indicates that the second network node is to send the error message relating to said one or more data packets to the third network node.

17. The method of claim 10, wherein the error message is a General packet radio service (GPRS) Tunnelling Protocol (GTP) error indication message, a GTP-User plane (GTP-U) message, or a GTP-U extension header.

18. The method of claim 10, wherein:

the first network node is a control plane (CP) entity of a central unit (CU) in a base station;

the second network node is a user plane (UP) entity of a CU in a base station;

the third network node is a user plane entity in a core network of the communication network, or any combination thereof.

19. A first network node in a communication network comprising:

a processor; and a memory, said memory containing instructions which, when executed by said processor, cause said first network node to perform operations to:

receive a first message from a second network node, wherein the first message indicates that the second network node has received one or more data packets that have a packet qualifier that is not known to the second network node;

wherein the operations further to perform one or both operations to:

(i) send a second message to the second network node, wherein the second message indicates that the second network node is to discard said one or more data packets; and (ii) send a third message to the second network node, wherein the third message indicates that the second network node is to send an error message relating to said one or more data packets to a third network node, wherein the third network node is a network node that transferred said one or more data packets to the second network node.

20. A second network node in a communication network comprising:

a processor; and a memory, said memory containing instructions which, when executed by said processor, cause said second network node to perform operations to:

send a first message to a first network node, wherein the first message indicates that the second network node has received one or more data packets that have a packet qualifier that is not known to the second network node;

wherein the operations further to perform one or both operations to:

(i) receive a second message from the first network node, wherein the second message indicates that the second network node is to discard said one or more data packets; and (ii) receive a third message from the first network node, wherein the third message indicates that the second network node is to send an error message relating to said one or more data packets to a third network node, wherein the third network node is a network node that transferred said one or more data packets to the second network node.

* * * * *